United States Patent
Norrie et al.

(10) Patent No.: US 10,365,987 B2
(45) Date of Patent: Jul. 30, 2019

(54) SYNCHRONOUS HARDWARE EVENT COLLECTION

(71) Applicant: Google LLC, Mountain View, CA (US)

(72) Inventors: Thomas Norrie, Mountain View, CA (US); Naveen Kumar, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/472,932

(22) Filed: Mar. 29, 2017

(65) Prior Publication Data

US 2018/0285233 A1    Oct. 4, 2018

(51) Int. Cl.
*G06F 11/34* (2006.01)
*G06F 11/30* (2006.01)
(Continued)

(52) U.S. Cl.
CPC .......... *G06F 11/3466* (2013.01); *G06F 9/542* (2013.01); *G06F 11/302* (2013.01);
(Continued)

(58) Field of Classification Search
CPC .... G06F 11/3466; G06F 9/542; G06F 11/302; G06F 11/3612
See application file for complete search history.

(56) References Cited

U.S. PATENT DOCUMENTS 4,598,364 A    7/1986  Gum et al.
5,682,328 A    10/1997 Roeber et al.
(Continued)

FOREIGN PATENT DOCUMENTS

| JP | H05128079 | 5/1993 |
|---|---|---|
| TW | 201640422 A | 11/2016 |
| TW | 201706842 | 2/2017 |

OTHER PUBLICATIONS

'www.processors.wiki.ti.com' [online] "Real-Time Hardware Trace and Analysis," last update date: Jun. 17, 2013, [retrieved on Dec. 13, 2016] Retrieved from Internet: URL< http://processors.wiki.ti.com/index.php/Real-Time_Hardware_Trace_and_Analysis> 3 pages.
'www.software.intel.com' [online] "Processor Tracing," Sep. 18, 2013 [retrieved on Dec. 2, 2016] Retrieved from Internet: URL< https://software.intel.com/en-us/blogs/2013/09/18/processor-tracing> 4 pages.
(Continued)

*Primary Examiner* — S. Sough
*Assistant Examiner* — Carina Yun
(74) *Attorney, Agent, or Firm* — Fish & Richardson P.C.

(57) ABSTRACT

A computer-implemented method that includes monitoring execution of program code by first and second processor components. A computing system detects that a trigger condition is satisfied by: i) identifying an operand in a portion of the program code; or ii) determining that a current time of a clock of the computing system indicates a predefined time value. The operand and the predefined time value are used to initiate trace events. When the trigger condition is satisfied the system initiates trace events that generate trace data identifying respective hardware events occurring across the computing system. The system uses the trace data to generate a correlated set of trace data. The correlated trace data indicates a time ordered sequence of the respective hardware events. The system uses the correlated set of trace data to analyze performance of the executing program code.

20 Claims, 7 Drawing Sheets

(51) Int. Cl.
*G06F 9/54* (2006.01)
*G06F 11/36* (2006.01)

(52) U.S. Cl.
CPC ...... *G06F 11/3495* (2013.01); *G06F 11/3612* (2013.01); *G06F 11/348* (2013.01); *G06F 2201/86* (2013.01); *G06F 2201/865* (2013.01)

(56) References Cited

U.S. PATENT DOCUMENTS

| | | | |
|---|---|---|---|
| 5,796,939 A * | 8/1998 | Berc | G06F 11/3409 711/216 |
| 6,098,169 A | 8/2000 | Ranganathan | |
| 6,128,415 A | 10/2000 | Hultgren, III et al. | |
| 6,134,676 A | 10/2000 | Vanhuben et al. | |
| 6,233,531 B1 | 5/2001 | Klassen | |
| 6,256,775 B1 | 7/2001 | Flynn | |
| 6,353,924 B1 * | 3/2002 | Ayers | G06F 11/3466 714/E11.2 |
| 6,530,076 B1 | 3/2003 | Ryan | |
| 6,769,054 B1 | 7/2004 | Sahin | |
| 6,789,182 B1 | 9/2004 | Brothers | |
| 8,713,370 B2 | 4/2014 | Millet et al. | |
| 8,762,951 B1 | 6/2014 | Kosche et al. | |
| 9,710,265 B1 * | 7/2017 | Temam | G06F 9/3001 |
| 9,836,691 B1 * | 12/2017 | Narayanaswami | G06N 3/04 |
| 9,858,167 B2 | 1/2018 | Neiger | |
| 9,875,167 B1 | 1/2018 | Norrie | |
| 2002/0120815 A1 | 8/2002 | Zahavi | |
| 2005/0144532 A1 | 1/2005 | Dombrowa et al. | |
| 2006/0005083 A1 | 1/2006 | Genden et al. | |
| 2006/0069938 A1 | 3/2006 | Olszewski et al. | |
| 2010/0083237 A1 | 4/2010 | Kneebone et al. | |
| 2010/0106678 A1 | 4/2010 | Pietrek et al. | |
| 2010/0251160 A1 | 9/2010 | Shafi | |
| 2011/0219376 A1 * | 9/2011 | Williams | G06F 11/3466 718/100 |
| 2011/0289302 A1 | 11/2011 | Ubukata et al. | |
| 2011/0289357 A1 | 11/2011 | Shiina | |
| 2011/0302560 A1 | 12/2011 | Nadbath | |
| 2011/0314342 A1 | 12/2011 | Gilkerson et al. | |
| 2012/0042212 A1 | 2/2012 | Laurenti | |
| 2012/0179898 A1 | 7/2012 | Betouin et al. | |
| 2012/0226837 A1 | 9/2012 | Cruickshank et al. | |
| 2012/0226839 A1 | 9/2012 | Fuoco | |
| 2012/0324290 A1 | 12/2012 | Chen | |
| 2013/0042155 A1 * | 2/2013 | Millet | G06F 11/3636 714/45 |
| 2015/0113228 A1 | 4/2015 | Huang | |
| 2016/0070636 A1 | 3/2016 | Furtwangler | |
| 2017/0177460 A1 | 6/2017 | Neiger | |
| 2018/0121517 A1 | 5/2018 | Barsness | |

OTHER PUBLICATIONS

'www.software.intel.com' [online] "Hardware Event-based Sampling Collection," Last updated date unavailable [retrieved on Dec. 2, 2016] Retrieved from Internet: URL<https://software.intel.com/en-us/node/544067> 3 pages.

'www.thenewstack.io' [online] "Hardware Tracing for Fast and Precise Performance Analysis," Oct. 12, 2015, [retrieved on Dec. 2, 2016] Retrieved from Internet: URL< https://thenewstack.io/hardware-tracing-fast-precise-performance-analysis/> 7 pages.

Lamport. "Time, Clocks, and the Ordering of Events in a Distributed System," Communications of the ACM 21.7, Jul. 1, 1978, 8 pages.

Li et al. "Template-based Memory Access Engine for Accelerators in SoCs," Proceedings of the 16th Asia and South Pacific Design Automation Conference. IEEE Press, Jan. 25, 2011, 7 pages.

Sigelman et al. "Dapper, a Large-Scale Distributed Systems Tracing Infrastructure," Google Technical Report dapper-2010-1, Apr. 2010, 14 pages.

Invite to Pay Additional Fees and, Where Applicable, Protest Fee, with Partial Search Report, issued in International Application No. PCT/US2017/057638, dated Mar. 1, 2018, 13 pages.

Extended European Search Report issued in European Application No. 17199338.9, dated Jun. 26, 2018, 14 pages.

Extended European Search Report issued in European Application No. 17199337.1, dated Feb. 26, 2018, 8 pages.

International Search Report and Written Opinion issued in International Application No. PCT/US2017/057619, dated Feb. 21, 2018, 13 pages.

Partial Search Report issued in European Application No. 17199338.9, dated Feb. 28, 2018, 13 pages.

International Search Report and Written Opinion issued in International Application No. PCT/US2017/057638, dated Apr. 26, 2018, 18 pages.

Office Action issued in British Application No. GB1717923.5, dated Apr. 10, 2018, 6 pages.

Office Action issued in British Application No. GB1717925.0, dated Apr. 18, 2018, 7 pages.

Office Action issued in Chinese Application No. 201721706223.5, dated May 11, 2018, 3 pages (with English Translation).

Office Action issued in Chinese Application No. 201721704657.x dated May 17, 2018, 5 pages (with English Translation).

Office Action issued in Taiwanese Application No. 106137283, dated Oct. 16, 2018, 14 pages (with English translation).

Office Action issued in Taiwanese Application No. 106137500, dated Oct. 4, 2018, 12 pages (with English translation).

International Preliminary Report on Patentability issued in international Application No. PCT/US2017/057619, dated Feb. 20, 2019, 22 pages.

* cited by examiner

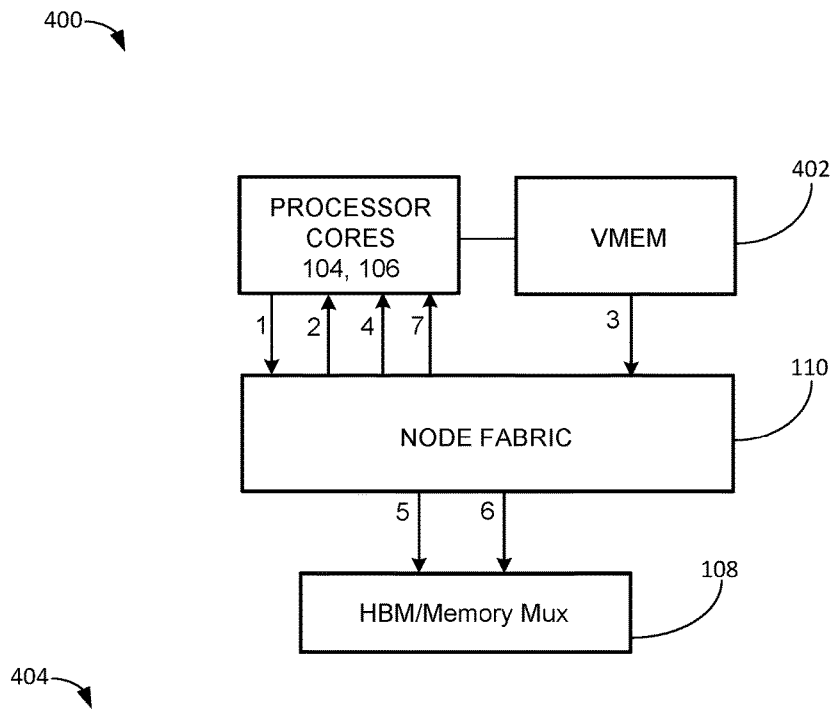

| STEP | OPERATION |
|---|---|
| 1 | INITIAL DMA REQUEST; TRACEPOINT IN NODE FABRIC |
| 2 | READ CMD: NF ASKS CORE TO TRANSFER DATA; TRACEPOINT IN NF |
| 3 | READ COMPLETE: NO TRACEPOINT IN NF HERE! |
| 4 | READ RESOURCE UPDATE: SYNC FLAG UPDATE IN CORE; TRACEPOINT IN FPC |
| 5 | WRITE CMD: NF NOTIFIES HBM; TRACEPOINT IN NF |
| 6 | WRITE COMPLETE: TRACEPOINT IN NF |
| 7 | WRITE RESOURCE UPDATE: SYNCH FLAG UPDATES IN FPC; TRACEPOINT IN FPC |

FIG. 4

SYNCHRONOUS HARDWARE EVENT COLLECTION

BACKGROUND

This specification relates to analyzing execution of program code.

Effective performance analysis of distributed software executing within distributed hardware components can be a complex task. Distributed hardware components can be respective processor cores of two or more Central Processing Units (CPUs) (or Graphics Processing Units (GPUs)) that cooperate and interact to execute portions of a larger software program or program code.

From the hardware perspective (e.g., within the CPUs or GPUs), there are generally two types of information or features available for performance analysis: 1) hardware performance counters and 2) hardware event traces.

SUMMARY

In general, one innovative aspect of the subject matter described in this specification can be embodied in a computer-implemented method executed by one or more processors, the method including, monitoring execution of program code by a first processor component, the first processor component being configured to execute at least a first portion of the program code; and monitoring execution of the program code by a second processor component, the second processor component being configured to execute at least a second portion of the program code.

The method further includes, detecting, by a computing system, that a trigger condition is satisfied based on at least one of: i) identifying an occurrence of an operand in at least the first portion of the program code or the second portion of the program code, the operand including a first parameter value used to initiate one or more trace events, or ii) determining that a current time of at least one clock of the computing system indicates a predefined time value used to initiate one or more trace events.

Responsive to detecting that the trigger condition is satisfied, the method includes, initiating, by the computing system, at least a first trace event that generates trace data, the trace data identifying respective hardware events occurring across distributed processor units that include at least the first processor component and the second processor component. For each of the respective hardware events, the trace data comprises at least a hardware event time stamp. The method further includes, using, by the computing system, the trace data to generate a correlated set of trace data that indicates at least a time ordered sequence of the respective hardware events that are generated when the trigger condition is satisfied.

These and other implementations can each optionally include one or more of the following features. For example, in some implementations, the first trace event is a synchronized trace event that generates trace data identifying hardware events occurring across the distributed processor units, the trace data also identifying a unique trace identifier for respective hardware events, and wherein the hardware events include a plurality of synchronized hardware events, and two hardware events are synchronized when the events share a global hardware event time stamp.

In some implementations, detecting that the trigger condition is satisfied comprises: detecting, by the computing system, that one of: i) the first parameter value of the operand exceeds a first bound value of a register, or ii) the predefined time value indicated by the current time exceeds a first bound value of a register; and responsive to detecting that the trigger condition is satisfied, initiating, by the computing system, a second trace event that generates trace data, wherein the trace data identifies at least one attribute that is shared among the respective hardware events occurring across the distributed processor units.

In some implementations, the method further includes: detecting, by the computing system, that one of: a second parameter value of the operand exceeds a second bound value of the register, or a second predefined time value indicated by the current time exceeds a second bound value of the register; and responsive to detecting, stopping, by the computing system, the second trace event when the second parameter value of the operand exceeds the second bound value, or when the second predefined time value exceeds the second bound value.

In some implementations, the operand further includes at least one of: a parameter indicating a particular sequence step of the program code; or a global control parameter that indicates a particular performance state of the distributed processor units; and the predefined time value includes at least one of: a particular time value indicated by a global time clock of the distributed processor units; or a particular time value of a predefined time window associated with the global time clock.

In some implementations, the operand has a first binary data structure and the first parameter value of the first operand corresponds to a trace-mark, the predefined time value has a second binary data structure and the current time is indicated by a global time clock, and wherein the global time clock is used by the distributed processor units to generate one or more hardware event time stamps.

In some implementations, the method further includes: inserting, by a compiler of the computing system, the operand of the trigger condition into at least the first portion of program code executed by the first processor component; and inserting, by the compiler of the computing system, at least one predefined time value of the trigger condition into at least the second portion of program code executed by the second processor component.

In some implementations, initiating at least one of the first trace event or the second trace event, includes: generating, by the computing system, a first control signal received by a first count register of the first processor core, the first control signal causing data associated with a first hardware event to be stored in the first count register; and generating, by the computing system, a second control signal received by a second count register of the second processor core, the second control signal causing data associated with a second hardware event to be stored in the second count register.

In some implementations, the data associated with one of the first hardware event or the second hardware event, comprises at least one of: a number of bytes written to a particular memory buffer of a particular processor core of the distributed processor units; or a number of instructions executed by a particular processor core of the distributed processor units.

In some implementations, the method further includes: identifying, by the computing system, an occurrence of a second operand in at least a portion of the program code executed by the first or second processor components, the second operand including a second parameter value; determining, by the computing system, that a filter condition is satisfied based on the second parameter value of the second operand one of: exceeding a particular bound value of a register or being below a particular bound value of the register; and responsive to determining that the filter condition is satisfied, filtering, by the computing system, one or more trace events, wherein filtering the one or more trace events comprises precluding storage of trace data associated with one or more hardware events.

Another innovative aspect of the subject matter described in this specification can be embodied in a hardware event collection system, including: one or more processors including one or more processor cores; one or more machine-readable storage units for storing instructions that are executable by the one or more processors to perform operations comprising: monitoring execution of program code by a first processor component, the first processor component being configured to execute at least a first portion of the program code; and monitoring execution of the program code by a second processor component, the second processor component being configured to execute at least a second portion of the program code.

The method further includes, detecting, by a computing system, that a trigger condition is satisfied based on at least one of: i) identifying an occurrence of an operand in at least the first portion of the program code or the second portion of the program code, the operand including a first parameter value used to initiate one or more trace events, or ii) determining that a current time of at least one clock of the computing system indicates a predefined time value used to initiate one or more trace events.

Responsive to detecting that the trigger condition is satisfied, the method includes, initiating, by the computing system, at least a first trace event that generates trace data, the trace data identifying respective hardware events occurring across distributed processor units that include at least the first processor component and the second processor component. For each of the respective hardware events, the trace data comprises at least a hardware event time stamp. The method further includes, using, by the computing system, the trace data to generate a correlated set of trace data that indicates at least a time ordered sequence of the respective hardware events that are generated when the trigger condition is satisfied.

In general, one innovative aspect of the subject matter described in this specification can be embodied in a computer-implemented method executed by one or more processors, the method including, monitoring execution of program code by a processor component, the processor component being configured to execute at least a first portion of the program code.

The method further includes, detecting, by a computing system, that a trigger condition is satisfied based on at least one of: i) identifying an occurrence of an operand in at least the first portion of the program code, the operand including a first parameter value used to initiate one or more trace events, or ii) determining that a current time of at least one clock of the computing system indicates a predefined time value used to initiate the one or more trace events.

Responsive to detecting that the trigger condition is satisfied, the method further includes, generating, by the computing system, a control signal received by a count register of the processor component, the control signal causing count data associated with a hardware event to be stored in the count register; and generating, by the computing system, a data structure that indicates one or more performance attributes associated with the executing program code, the data structure being generated based on one or more count parameters of the stored count data.

These and other implementations can each optionally include one or more of the following features. For example, in some implementations, the count register is one of multiple performance counters configured to store count data about the performance of one or more processor components of the computing system, and wherein at least one performance counter includes one of: an activity counter, a stall counter, statistical counter, or a sampling counter.

In some implementations, the one or more count parameters indicates one of: i) a number of instructions received by a particular processor component; ii) a number of instructions processed by the particular processor component; iii) a number of instructions executed by the particular processor component; or iv) a number of memory reads, or a number of memory writes, performed by the particular processor component.

In some implementations, a performance attribute associated with the executing program code comprises one of: i) a stall frequency of a particular processor component executing the program code; ii) an indication that utilization of the particular processor component is below a threshold utilization; or iii) an indication that a data storage queue used by the particular processor component is at, or below, a queue occupancy threshold.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages. The described hardware tracing system enhances computational efficiency by using dynamic triggers that execute through hardware knobs/features. The triggers enable synchronized capture of events based, in part, on a global time counter, embedded logical operands, and hardware registers, rather than purely through coded sequences which typically require system resources to monitor and execute event capture.

Likewise, system memory use is optimized when hardware triggers are tuned to capture short duration events and synchronized global captures that occur simultaneously instead of as uncorrelated inefficient event captures. Controls for shorter duration synchronized event capture mitigates information overload thereby enabling some memory resources to remain unused and available for other system processes.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 4 is a block diagram indicating trace activity for a direct memory access trace event executed by an example computing system for distributed hardware tracing.

Like reference numbers and designations in the various drawings indicate like elements.

DETAILED DESCRIPTION

The subject matter described in this specification generally relates to distributed hardware tracing. In particular, a computing system monitors execution of program code executed by a first processor core and execution of program code executed by a second processor core. The computing system stores a timeline of hardware events in a memory buffer. The stored events occur across distributed processor units that include at least the first and second processor cores.

The timeline includes, for each of the hardware events, an event time stamp and metadata characterizing the hardware event. The system generates a data structure including hardware events from the timeline. The system stores the data structure in a memory bank of a host device and uses the data structure to assess performance of the program code executed by the first or second processor cores. Within this context of event tracing, this specification describes approaches for hardware event tracing in a distributed computing system, shown in FIGS. 1-4.

Figure 5:
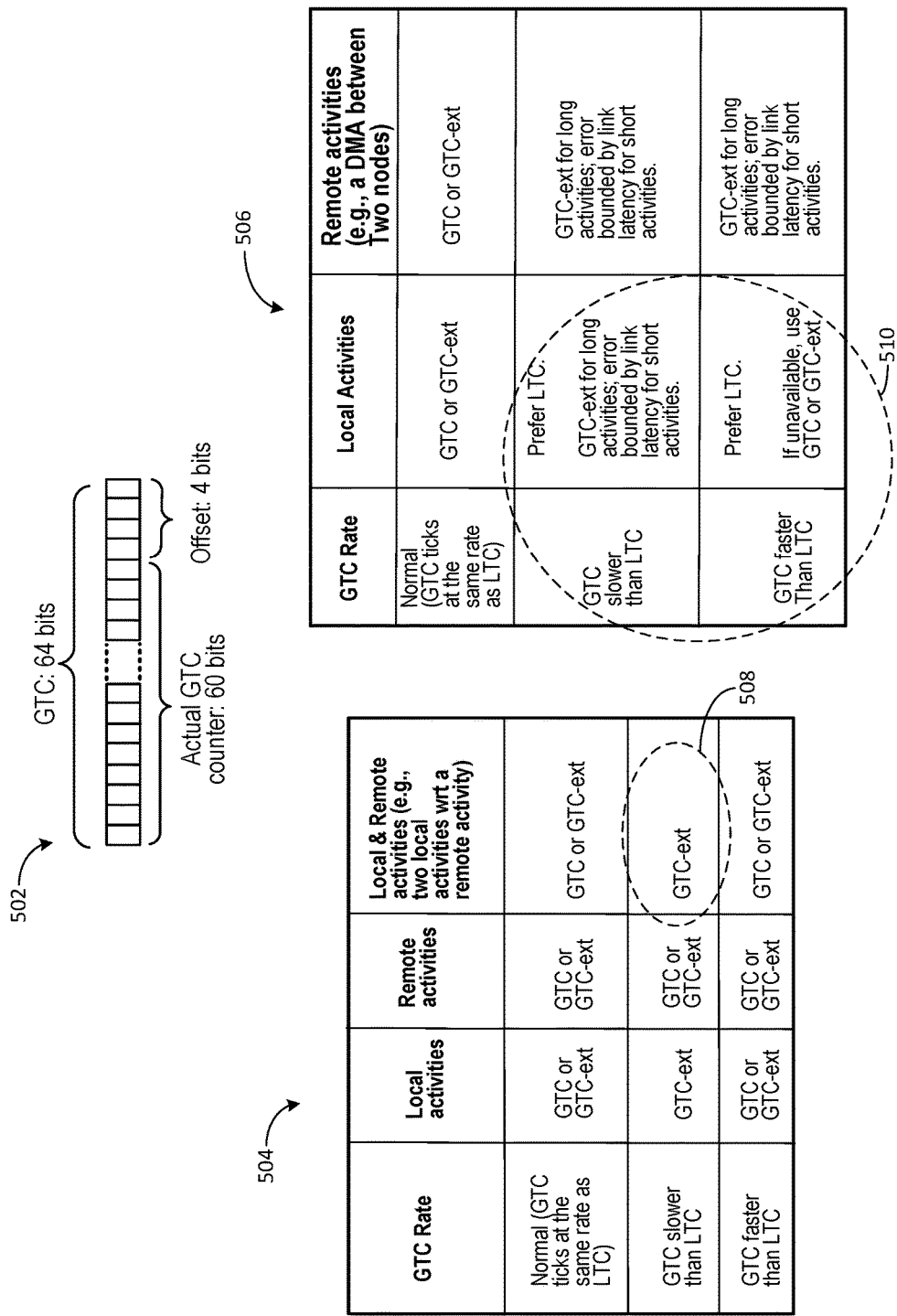
FIG. 5 illustrates an example data structure for a global time counter (GTC) and tables that indicate usage scenarios of the GTC by an example computing system for distributed hardware tracing.
Figure 6:
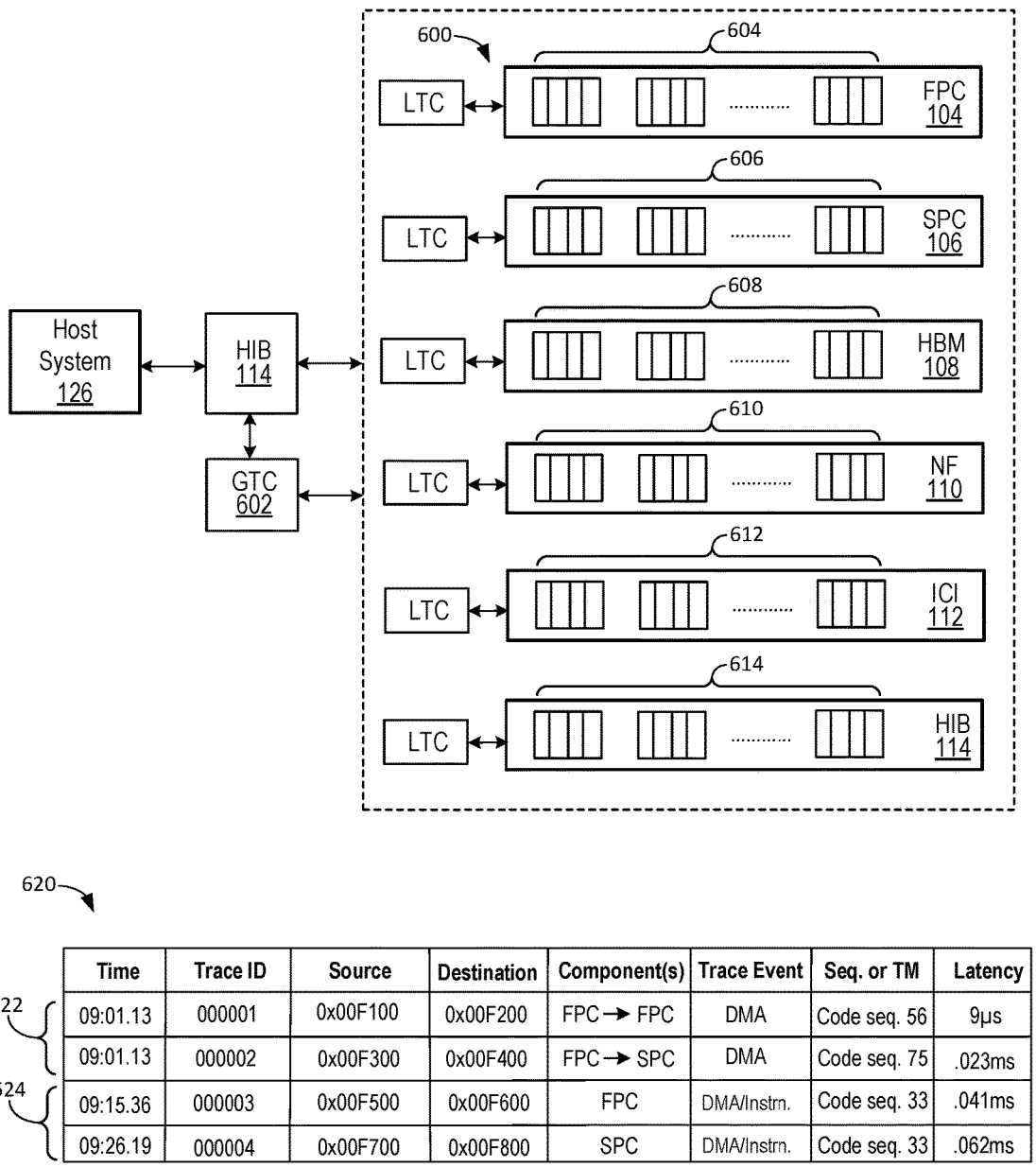
FIG. 6 illustrates a block diagram of example time counters and hardware features associated with components of an example computing system for distributed hardware tracing.
Figure 7:
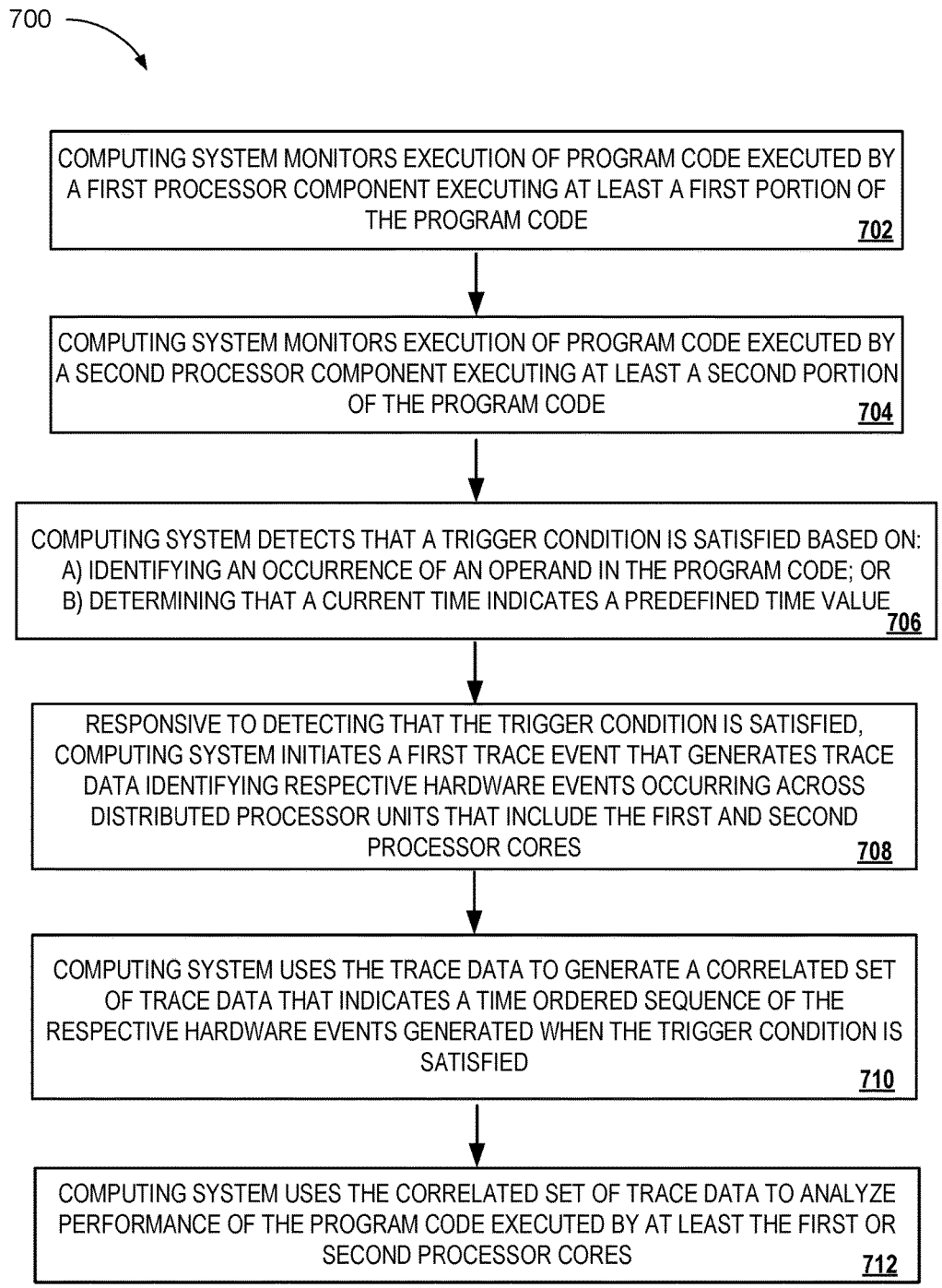
FIG. 7 is a process flow diagram of an example process for distributed hardware tracing.

This specification further describes approaches for synchronized hardware event collection based on one or more trigger mechanisms, shown in FIGS. 5-7. As will be discussed in more detail below, aspects of the computing systems described in this specification relate at least to coordinated/synchronous collection of tracing data and event counting. In particular, at least one aspect includes systems and methods for synchronized collection of hardware performance counter data and trace event data within a standalone as well as a distributed system. Synchronized event collection enhances analysis of both performance data and debugging data of distributed program code. The enhanced analysis is achieved, in part, through correlation of events that occur in response to execution of connected software components/modules analyzed by system 100.

Figure 1:
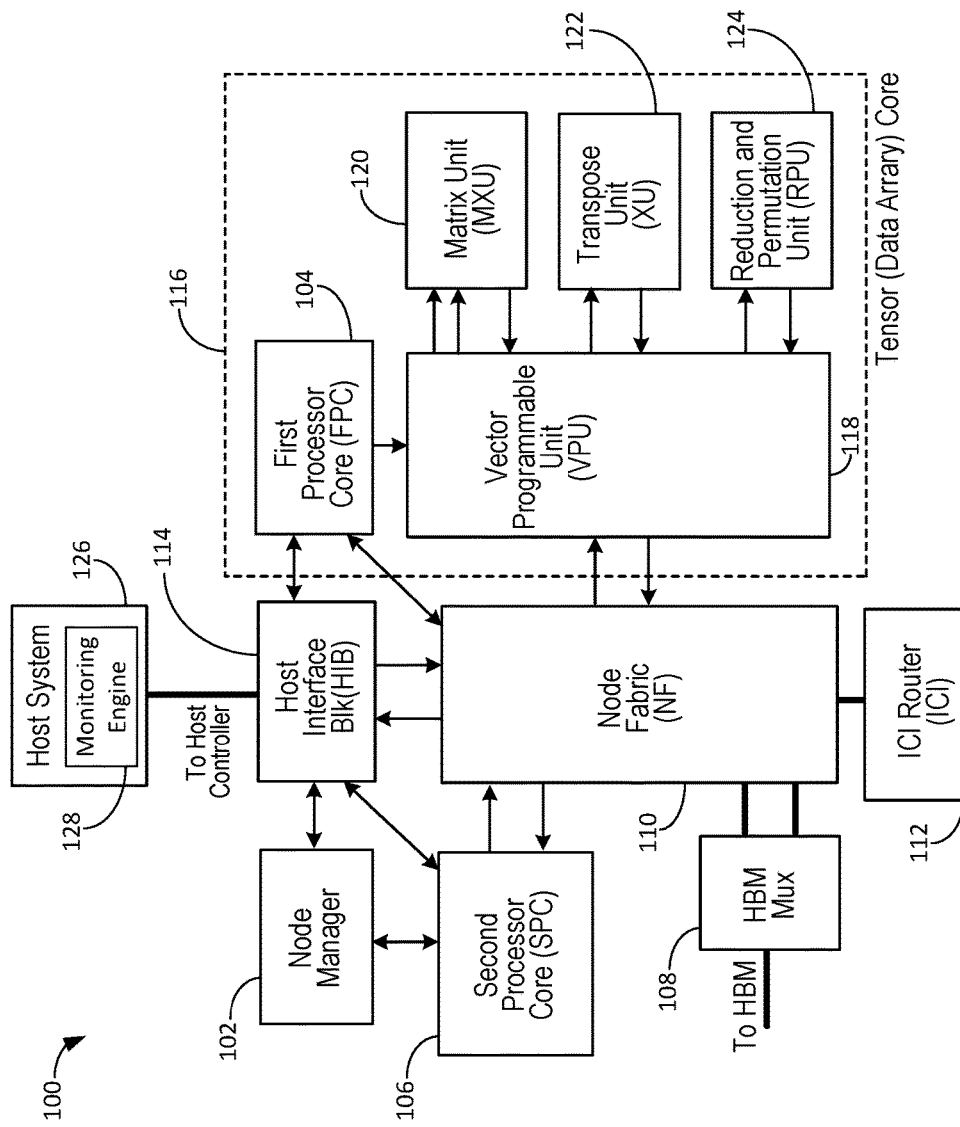
FIG. 1 illustrates a block diagram of an example computing system for distributed hardware tracing.

FIG. 1 illustrates a block diagram of an example computing system 100 for distributed hardware tracing. As used in this specification, distributed hardware system tracing corresponds to storage of events that occur within components and sub-components of an example processor micro-chip. Further, as used herein, a distributed hardware system (or tracing system) corresponds to a collection of processor micro-chips that cooperate to execute respective portions of a software/program code configured for distributed execution amongst the collection of processor micro-chips. In some implementations, different processor chips of system 100 can form respective nodes of the distributed hardware system. In alternative implementations, a single processor chip can include one or more processor cores and hardware features that can each form respective nodes of the processor chip.

For example, in the context of a central processing unit (CPU), a processor chip can include at least two nodes and each node can be a respective core of the CPU. Alternatively, in the context of a graphical processor unit (GPU), a processor chip can include at least two nodes and each node can be a respective streaming multiprocessor of the GPU. Computing system 100 can include multiple processor components. In some implementations, the processor components can be at least one of a processor chip, a processor core, a memory access engine, or at least one hardware component of the overall computing system 100.

In some instances, a processor component, such as a processor core, can be a fixed-function component configured to execute at least one specific operation based on at least one issued instruction of the executing program code. In other instances, a processor component, such as a memory access engine (MAE), can be configured to execute program code at a lower level of detail or granularity than program code executed by other processor components of system 100.

For example, program code executed by a processor core can cause an MAE descriptor to be generated and transmitted/sent to the MAE. After receipt of the descriptor, the MAE can execute a data transfer operation based on the MAE descriptor. In some implementations, data transfers executed by the MAE can include, for example, moving data to and from certain components of system 100 via certain data paths or interface components of the system, or issuing data requests onto an example configuration bus of system 100.

In some implementations, each tensor node of an example processor chip of system 100 can have at least two "front-ends" which can be hardware blocks/features that process program instructions. As discussed in more detail below, a first front-end can correspond to first processor core 104, while a second front-end can correspond to second processor core 106. Hence, the first and second processor cores may also be described herein as first front-end 104 and second front-end 106.

As used in this specification, a trace chain can be a specific physical data communication bus that trace entries can be put onto for transmission to an example chip manager within system 100. Received trace entries can be data words/structures including multiple bytes and multiple binary values or digits. Thus, the descriptor "word" indicates a fixed-sized piece of binary data that can be handled as a unit by hardware devices of an example processor core.

In some implementations, the processor chips of the distributed hardware tracing system are multi-core processors (i.e., having multiple cores) that each execute portions of program code in respective cores of the chip. In some implementations, portions of program code can correspond to vectorized computations for inference workloads of an example multi-layer neural network. While in alternative implementations, portions of program code can correspond generally to software modules associated with conventional programming languages.

Computing system 100 generally includes a node manager 102, a first processor core (FPC) 104, a second processor core (SPC) 106, a node fabric (NF) 110, a data router 112, and a host interface block (HIB) 114. In some implementations, system 100 can include a memory mux 108 that is configured to perform signal switching, multiplexing, and de-multiplexing functions. System 100 further includes a tensor core 116 that includes FPC 104 disposed therein. Tensor core 116 can be an example computational device configured to perform vectorized computations on multi-dimensional data arrays. Tensor core 116 can include a vector processing unit (VPU) 118, that interacts with a matrix unit (MXU) 120, transpose unit (XU) 122, and reduction and permutation unit (RPU) 124. In some implementations, computing system 100 can include one or more execution units of a conventional CPU or GPU, such as load/store units, arithmetic logic units (ALU's) and vector units.

The components of system 100 collectively include a large set of hardware performance counters as well as support hardware that facilitates completion of tracing activity within the components. As described in more detail below, program code executed by respective processor cores of system 100 can include embedded triggers used to simultaneously enable multiple performance counters during code execution. In general, detected triggers cause trace data to be generated for one or more trace events. The trace data can correspond to incremental parameter counts that are stored in the counters and that can be analyzed to discern performance characteristics of the program code. Data for respective trace events can be stored in an example storage medium (e.g., a hardware buffer) and can include a timestamp that is generated responsive to detection of the trigger.

Further, trace data can be generated for a variety of events occurring within hardware components of system 100. Example events can include inter-node and cross-node communication operations, such as direct memory access (DMA) operations and sync flag updates (each described in more detail below). In some implementations, system 100 can include a globally synchronous timestamp counter generally referred to as Global Time Counter ("GTC"). In other implementations, system 100 can include other types of global clocks, such as a Lamport Clock.

The GTC can be used for precise correlation of program code execution and performance of software/program code that executes in a distributed processing environment. Additionally, and related in part to the GTC, in some implementations system 100 can include one or more trigger mechanisms used by distributed software programs to start and stop data tracing in a distributed system in a highly coordinated manner.

In some implementations, a host system 126 compiles program code that can include embedded operands that trigger, upon detection, to cause capture and storage of trace data associated with hardware events. In some implementations, host system 126 provides the compiled program code to one or more processor chips of system 100. In alternative implementations, program code can be compiled (with embedded triggers) by an example external compiler and loaded to the to one or more processor chips of system 100. In some instances, the compiler can set one or more trace bits (discussed below) associated with certain triggers that are embedded in portions of software instructions. The compiled program code can be a distributed software program that is executed by the one or more components of system 100.

Host system 126 can include a monitoring engine 128 configured to monitor execution of program code by one or more components of system 100. In some implementations, monitoring engine 128 enables host system 126 to monitor execution of program code executed by at least FPC 104 and SPC 106. For example, during code execution, host system 126 can monitor, via monitoring engine 128, performance of the executing code at least by receiving periodic timelines of hardware events based on generated trace data. Although a single block is shown for host system 126, in some implementations, system 126 can include multiple hosts (or host subsystems) that are associated with multiple processor chips or chip cores of system 100.

In other implementations, cross-node communications that involve at least three processor cores may cause host system 126 to monitor data traffic at one or more intermediate "hops" as data traffic traverses a communication path between FPC 104 and an example third processor core/node. For example, FPC 104 and the third processor core may be the only cores executing program code at given time period. Hence, a data transfer from FPC 104 to the third processor core can generate trace data for an intermediate hop at SPC 106 as data is transferred from FPC 104 to the third processor core. Stated another way, during data routing in system 100, data from a first processor chip going to a third processor chip may need to traverse a second processor chip, and so execution of the data routing operation may cause trace entries to be generated for routing activity in the second chip.

Upon execution of the compiled program code, the components of system 100 can interact to generate timelines of hardware events that occur in a distributed computer system. The hardware events can include intra-node and cross-node communication events. Example nodes of a distributed hardware system and their associated communications are described in more detail below with reference to FIG. 2. In some implementations, a data structure is generated that identifies a collection of hardware events for at least one hardware event timeline. The timeline enables reconstruction of events that occur in the distributed system. In some implementations, event reconstruction can include correct event ordering based on analysis of time stamps generated during occurrence of a particular event.

In general, an example distributed hardware tracing system can include the above described components of system 100 as well as at least one host controller associated with a host system 126. Performance or debugging of data obtained from a distributed tracing system can be useful when the event data is correlated in, for example, a time-ordered or sequenced manner. In some implementations, data correlation can occur when multiple stored hardware events corresponding to connected software modules are stored and then sequenced for structured analysis by host system 126. For implementations including multiple host systems, correlation of data obtained via the different hosts may be performed, for example, by the host controller.

In some implementations, FPC 104 and SPC 106 are each distinct cores of a multi-core processor chip; while in other implementations, FPC and SPC 104, 106 are respective cores of distinct multi-core processor chips. As indicated above, system 100 can include distributed processor units having at least FPC 104 and SPC 106. In some implementations, distributed processor units of system 100 can include one or more hardware or software components configured to execute at least a portion of a larger distributed software program or program code.

Data router 112 is an inter-chip interconnect (ICI) providing data communication paths between the components of system 100. In particular, router 112 can provide communication coupling or connections between FPC 104 and SPC 106, and between the respective components associated with cores 104, 106. Node fabric 110 interacts with data router 112 to move data packets within the distributed hardware components and sub-components of system 100.

Node manager 102 is a high-level device that manages low-level node functions in multi-node processor chips. As discussed in more detail below, one or more nodes of a processor chip can include chip managers controlled by node manager 102 to manage and store hardware event data in local entry logs. Memory mux 108 is a multiplexing device that can perform switching, multiplexing, and de-multiplexing operations on data signals provided to an example external high bandwidth memory (HBM) or data signals received from the external HBM.

In some implementations, an example trace entry (described below) can be generated, by mux 108, when mux 108 switches between FPC 104 and SPC 106. Memory mux 108 can potentially impact performance of a particular processor core 104, 106 that is not able to access mux 108. Thus, trace entry data generated by mux 108 can aid in understanding resulting spikes in latencies of certain system activities associated with the respective cores 104, 106. In some implementations, hardware event data (e.g., trace points discussed below) originating within mux 108 can be grouped, in an example hardware event timeline, along with event data for node fabric 110. Event grouping can occur when certain tracing activity causes event data for multiple hardware components to be stored in an example hardware buffer (e.g., trace entry log 218, discussed below).

In system 100, performance analysis hardware encompasses FPC 104, SPC 106, mux 108, node fabric 110, data router 112, and HIB 114. Each of these hardware components or units include hardware performance counters as well as hardware event tracing facilities and functions. In some implementations, VPU 118, MXU 120, XU 122 and RPU 124 do not include their own dedicated performance hardware. Rather, in such implementations, FPC 104 can be configured to provide the necessary counters for VPU 118, MXU 120, XU 122 and RPU 124.

VPU 118 can include an internal design architecture that supports localized high bandwidth data processing and arithmetic operations associated with vector elements of an example matrix-vector processor. MXU 120 is a matrix multiplication unit configured to perform, for example, up to 128×128 matrix multiplies on vector data sets of multiplicands.

XU 122 is a transpose unit configured to perform, for example, up to 128×128 matrix transpose operations on vector data associated with the matrix multiply operations. RPU 124 can include a sigma unit and a permute unit. The sigma unit executes sequential reductions on vector data associated with the matrix multiply operations. The reductions can include sums and various types of compare operations. The permute unit can fully permute or replicate all elements of vector data associated with the matrix multiply operations.

In some implementations, program code executed by the components of system 100 can be representative of machine learning, neural network inference computations, and/or one or more direct memory access functions. Components of system 100 can be configured to execute one or more software programs including instructions that cause a processing unit(s) or device(s) of the system to execute one or more functions. The term "component" is intended to include any data processing device or storage device such as control status registers or any other device able to process and store data.

System 100 can generally include multiple processing units or devices that can include one or more processors (e.g., microprocessors or central processing units (CPUs)), graphics processing units (GPUs), application specific integrated circuits (ASICs), or a combination of different processors. In alternative embodiments, system 100 can each include other computing resources/devices (e.g., cloud-based servers) that provide additional processing options for performing computations related to hardware tracing functions described in this specification.

The processing units or devices can further include one or more memory units or memory banks (e.g., registers/counters). In some implementations, the processing units execute programmed instructions stored in memory to devices of system 100 to perform one or more functions described in this specification. The memory units/banks can include one or more non-transitory machine-readable storage mediums. The non-transitory machine-readable storage medium can include solid-state memory, magnetic disk, and optical disk, a random access memory (RAM), a read-only memory (ROM), an erasable programmable read-only memory (e.g., EPROM, EEPROM, or Flash memory), or any other tangible medium capable of storing information.

Figure 2:
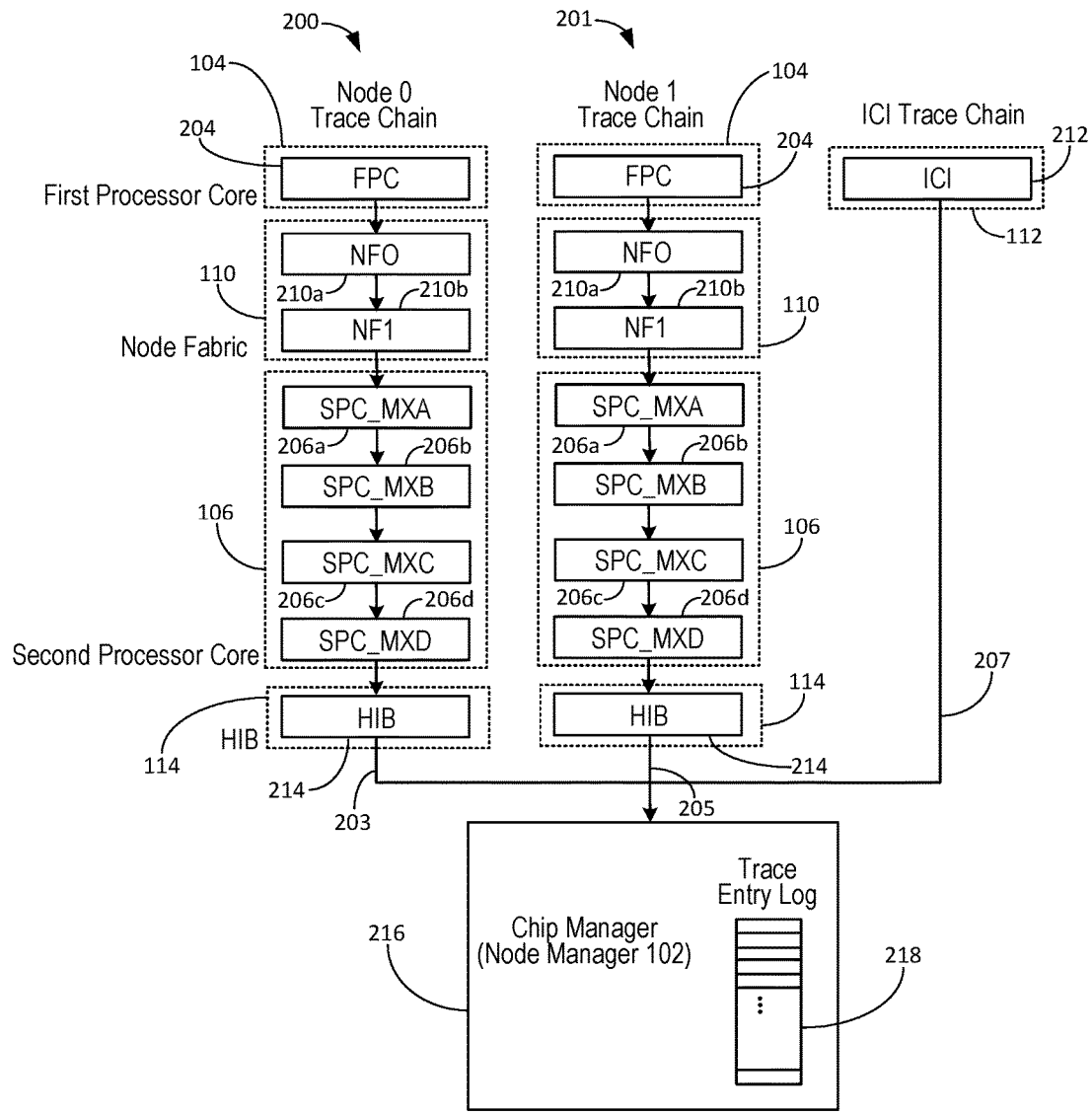
FIG. 2 illustrates a block diagram of trace chains and respective nodes of an example computing system for distributed hardware tracing.

FIG. 2 illustrates a block diagram of example trace chains and respective example nodes 200, 201 used for distributed hardware tracing executed by system 100. In some implementations, the nodes 200, 201 of system 100 can be different nodes within a single multi-core processor. In other implementations, node 200 can be a first node in a first multi-core processor chip and node 201 can be a second node in a second multi-core processor chip.

Although two nodes are depicted in the implementation of FIG. 2, in alternative implementations, system 100 can include multiple nodes. For implementations involving multiple nodes, cross-node data transfers can generate trace data at intermediate hops along an example data path that traverse multiple nodes. For example, intermediate hops can correspond to data transfers which pass through distinct nodes in a particular data transfer path. In some instances, trace data associated with ICI traces/hardware events can be generated for one or more intermediate hops that occur during cross-node data transfers which pass through one or more nodes.

In some implementations, node 0 and node 1 are tensor nodes used for vectorized computations associated with portions of program code for inference workloads. As used in this specification, a tensor is a multi-dimensional geometric object and example multi-dimensional geometric objects include matrices and data arrays.

As shown in the implementation of FIG. 2, node 200 includes a trace chain 203 that interacts with at least a subset of the components of system 100. Likewise, node 201 includes a trace chain 205 that interacts with at least a subset of the components of system 100. In some implementations, nodes 200, 201 are example nodes of the same subset of components, while in other implementations, nodes 200, 201 are respective nodes of distinct component subsets. Data router/ICI 112 includes a trace chain 207 that generally converges with trace chains 203 and 205 to provide trace data to chip manager 216.

In the implementation of FIG. 2, nodes 200, 201 can each include respective component subsets having at least FPC 104, SPC 106, node fabric 110, and HIB 114. Each component of nodes 200, 201 includes one or more trace muxes configured to group trace points (described below) generated by a particular component of the node. FPC 104 includes a trace mux 204, node fabric 110 includes trace muxes 210a/b, SPC 106 includes trace muxes 206a/b/c/d, HIB 214 includes trace mux 214, and ICI 212 includes trace mux 212. In some implementations, a trace control register for each trace mux allows individual trace points to be enabled and disabled. In some instances, for one or more trace muxes, their corresponding trace control registers can include individual enable bits as well as broader trace mux controls.

In general, the trace control registers can be conventional control status registers (CSR) that receive and store trace instruction data. Regarding the broader trace mux controls, in some implementations, tracing can be enabled and disabled based on CSR writes executed by system 100. In some implementations, tracing can be dynamically started and stopped, by system 100, based on the value of a global time counter (GTC), based on the value of an example trace-mark register in the FPC 104 (or core 116), or based on the value of an example trace-mark register in SPC 106.

Additional details and descriptions relating to systems and methods for dynamically starting and stopping tracing activity as well as for synchronized hardware event collection are described in more detail with reference to the implementations of FIGS. 5-7.

In some implementations, for core 116, FPC 104 can use a trace control parameter to define a trace window associated with event activity occurring within core 116. The trace control parameter allows the trace window to be defined in terms of lower and upper bounds for the GTC as well as lower and upper bounds for the trace-mark register.

In some implementations, system 100 can include functions that enable reduction of the number of trace entries that are generated, such as trace event filtering features. For example, FPC 104 and SPC 106 can each include filtering features which limit the rate at which each core sets a trace bit in an example generated trace descriptor (described below). HIB 114 can include similar filtering features such as an example DMA rate limiter that limits trace bits associated with capture of certain DMA trace events. Additionally, HIB 114 can include controls (e.g., via an enable bit) for limiting which queues source DMA trace entries.

In some implementations, a descriptor for a DMA operation can have a trace bit that is set by an example compiler of host system 126. When the trace bit is set, hardware features/knobs that determine and generate trace data are used to complete an example trace event. In some instances, a final trace bit in the DMA can be a logical OR operation between a trace bit that is statically inserted by the compiler and a trace bit that is dynamically determined by a particular hardware component. Hence, in some instances, the compiler generated trace bit can provide a mechanism, apart from filtering, to reduce an overall amount of trace data that is generated.

For example, a compiler of host system 126 may decide to only set trace bits for one or more remote DMA operations (e.g., a DMA across at least two nodes) and clear trace bits for one or more local DMA operations (e.g., a DMA within a particular tensor node, such as node 200). In this manner, an amount of trace data that is generated can be reduced based on tracing activity being limited to cross-node (i.e., remote) DMA operations, rather than tracing activity that includes both cross-node and local DMA operations.

In some implementations, at least one trace event initiated by system 100 can be associated with a memory access operation that includes multiple intermediate operations occurring across system 100. A descriptor (e.g., an MAE descriptor) for the memory access operation can include a trace bit that causes data associated with the multiple intermediate operations to be stored in one or more memory buffers. Thus, the trace bit can be used to "tag" intermediate memory operations and generate multiple trace events at intermediate hops of the DMA operation as data packets traverse system 100.

In some implementations, ICI 112 can include a set of enable bits and a set of packet filters that provide control functionality for each ingress and egress port of a particular component of node 200, 201. These enable bits and packet filters allow ICI 112 to enable and disable trace points associated with particular components of nodes 200, 201. In addition to enabling and disabling trace points, ICI 112 can be configured to filter trace data based on event source, event destination, and trace event packet type.

In some implementations, in addition to using the GTC or trace markers, each trace control register for processor cores 104, 106 and HIB 114 can also include an "everyone" trace mode. This "everyone" trace mode can enable tracing across an entire processor chip to be controlled by either trace mux 204 or trace mux 206a. While in the everyone trace mode, traces muxes 204 and 206a can send an "in-window" trace control signal that specifies whether or not that particular trace mux, either mux 204 or mux 206a, is in a trace window.

The in-window trace control signal can be broadcast or universally transmitted to all other trace muxes, for example, within a processor chip or across multiple processor chips. The broadcast to the other trace muxes can cause all tracing to be enabled when either mux 204 or mux 206a is executing tracing activity. In some implementations, trace muxes associated with processor cores 104, 106, and HIB 114 each include a trace window control register that specifies when and/or how the "everyone trace" control signal is generated.

In some implementations, tracing activity in trace muxes 210a/b and trace mux 212, is generally enabled based on whether a trace bit is set in data words for DMA operations or control messages that traverses ICI/data router 112. DMA operations or control messages can be fixed-size binary data structures that can have a trace bit within the binary data packets set based on certain circumstances or software conditions.

For example, when a DMA operation is initiated in FPC 104 (or SPC 106) with a trace-type DMA instruction and the initiator (processor cores 104 or 106) is in a trace window, the trace bit will be set in that particular DMA. In another example, for FPC 104, control messages for data writes to another component within system 100 will have the trace bit set if FPC 104 is in a trace window and a trace point that causes trace data to be stored is enabled.

In some implementations, zero-length DMA operations provide an example of a broader DMA implementation within system 100. For example, some DMA operations can produce non-DMA activity within system 100. Execution of the non-DMA activity can also be traced (e.g., generate trace data) as if the non-DMA activity were a DMA operation (e.g., DMA activity including non-zero-length operations). For example, a DMA operation initiated at a source location but without any data (e.g., zero-length) to be sent or transferred could instead send a control message to the destination location. The control message will indicate that there is no data to be received, or worked with, at the destination, and the control message itself would be traced by system 100 as a non-zero-length DMA operation would be traced.

In some instances, for SPC 106, zero-length DMA operations can generate a control message, and a trace bit associated with the message is set only if the DMA would have had the trace bit set, i.e., had the control message not had a zero-length. In general, DMA operations initiated from host system 126 will have the trace bit set if HIB 114 is in a trace window.

In the implementation of FIG. 2, trace chain 203 receives trace entry data for the component subset that aligns with node 0, while trace chain 205 receives trace entry data for the component subset that aligns with node 1. Each trace chain 203, 205, 207 are distinct data communication paths used by respective nodes 200, 201 and ICI 112 to provide trace entry data to an example trace entry data log 218 of a chip manager 216. Thus, the endpoint of trace chains 203, 205, 207 is chip manager 216 where trace events can be stored in example memory units.

In some implementations, at least one memory unit of chip manager 216 can be 128-bit wide and can have a memory depth of at least 20,000 trace entries. In alternative implementations, at least one memory unit can have a larger or smaller bit-width and can have a memory depth capable of storing more or fewer entries.

In some implementations, chip manager 216 can include at least one processing device executing instructions to manage received trace entry data. For example, chip manager 216 can execute instructions to scan/analyze time stamp data for respective hardware events of trace data received via trace chains 203, 205, 207. Based on the analysis, chip manager 216 can populate trace entry log 218 to include data that can be used to identify (or generate) a time-ordered sequence of hardware trace events. The hardware trace events can correspond to movement of data packets occurring at the component and sub-component level when processing units of system 100 execute an example distributed software program.

In some implementations, hardware units of system 100 may generate trace entries (and corresponding timestamps) that populate an example hardware trace buffer in a non-time-ordered manner (i.e., out-of-order). For example, chip manager 216 can cause multiple trace entries, having generated time-stamps, to be inserted into entry log 218. Respective trace entries, of the multiple inserted trace entries, may not be time-ordered relative to one another. In this implementation, non-time-ordered trace entries can be received by an example host buffer of host system 126. Upon receipt by the host buffer, host system 126 can execute instructions relating to performance analysis/monitoring software to scan/analyze time stamp data for the respective trace entries. The executed instructions can be used to sort the trace entries and to construct/generate a timeline of hardware trace events.

In some implementations, trace entries can be removed from entry log 218 during a tracing session via a host DMA operation. In some instances, host system 126 may not DMA entries out of trace entry log 218 as quickly as they are added to the log. In other implementations, entry log 218 can include a predefined memory depth. If the memory depth limit of entry log 218 is reached, additional trace entries may be lost. In order to control which trace entries are lost, entry log 218 can operate in first-in-first-out (FIFO) mode, or, alternatively, in an overwrite recording mode.

In some implementations, the overwrite recording mode can be used, by system 100, to support performance analysis associated with post-mortem debugging. For example, program code can be executed for a certain time-period with tracing activity enabled and overwrite recording mode enabled. In response to a post-mortem software event (e.g., a program crash) within system 100, monitoring software executed by host system 126 can analyze the data contents of an example hardware trace buffer to gain insight into hardware events that occurred before the program crash. As used in this specification, post-mortem debugging relates to analysis or debugging of program code after the code has crashed or has generally failed to execute/operate as intended.

In FIFO mode, if entry log 218 is full, and if host system 126 does remove saved log entries within a certain timeframe, to conserve memory resources, new trace entries may not be saved to a memory unit of chip manager 216. While in the overwrite recording mode, if entry log 218 is full because host system 126 does remove saved log entries within a certain timeframe, to conserve memory resources, new trace entries can overwrite the oldest trace entry stored within entry log 218. In some implementations, trace entries are moved to a memory of host system 126 in response to a DMA operation using processing features of HIB 114.

As used in this specification, a trace point is the generator of a trace entry and data associated with the trace entry received by chip manager 216 and stored in trace entry log 218. In some implementations, a multi-core multi-node processor microchip can include three trace chains within the chip such that a first trace chain receives trace entries from a chip node 0, a second trace chain receives trace entries from a chip node 1, and a third trace chain receives trace entries from an ICI router of the chip.

Each trace point has a unique trace identification number, within its trace chain, that it inserts into the header of the trace entry. In some implementations, each trace entry identifies the trace chain it originated from in a header indicated by one or more bytes/bits of the data word. For example, each trace entry can include a data structure having defined field formats (e.g., header, payload, etc.) that convey information about a particular trace event. Each field in a trace entry corresponds to useful data applicable to the trace point that generated the trace entry.

As indicated above, each trace entry can be written to, or stored within, a memory unit of chip manager 216 associated with trace entry log 218. In some implementations, trace points can be enabled or disabled individually and multiple trace points can generate the same type of trace entry although with different trace point identifiers.

In some implementations, each trace entry type can include a trace name, trace description, and a header that identifies encodings for particular fields and/or a collection of fields within the trace entry. The name, description, and header collectively provide a description of what the trace entry represents. From the perspective of chip manager 216, this description can also identify the particular trace chain 203, 205, 207 that a specific trace entry came in on within a particular processor chip. Thus, fields within a trace entry represent pieces of data (e.g., in bytes/bits) relevant to the description and can be a trace entry identifier used to determine which trace point generated a particular trace entry.

In some implementations, trace entry data associated with one or more of the stored hardware events can correspond, in part, to data communications that occur: a) between at least a node 0 and node 1; b) between at least components within node 0; and c) between at least components within node 1. For example, stored hardware events can correspond, in part, to data communications that occur between at least one of: 1) FPC 104 of node 0 and FPC 104 of node 1; FPC 104 of node 0 and SPC 106 of node 0; 2) SPC 106 of node 1 and SPC 106 of node 1.

Figure 3:
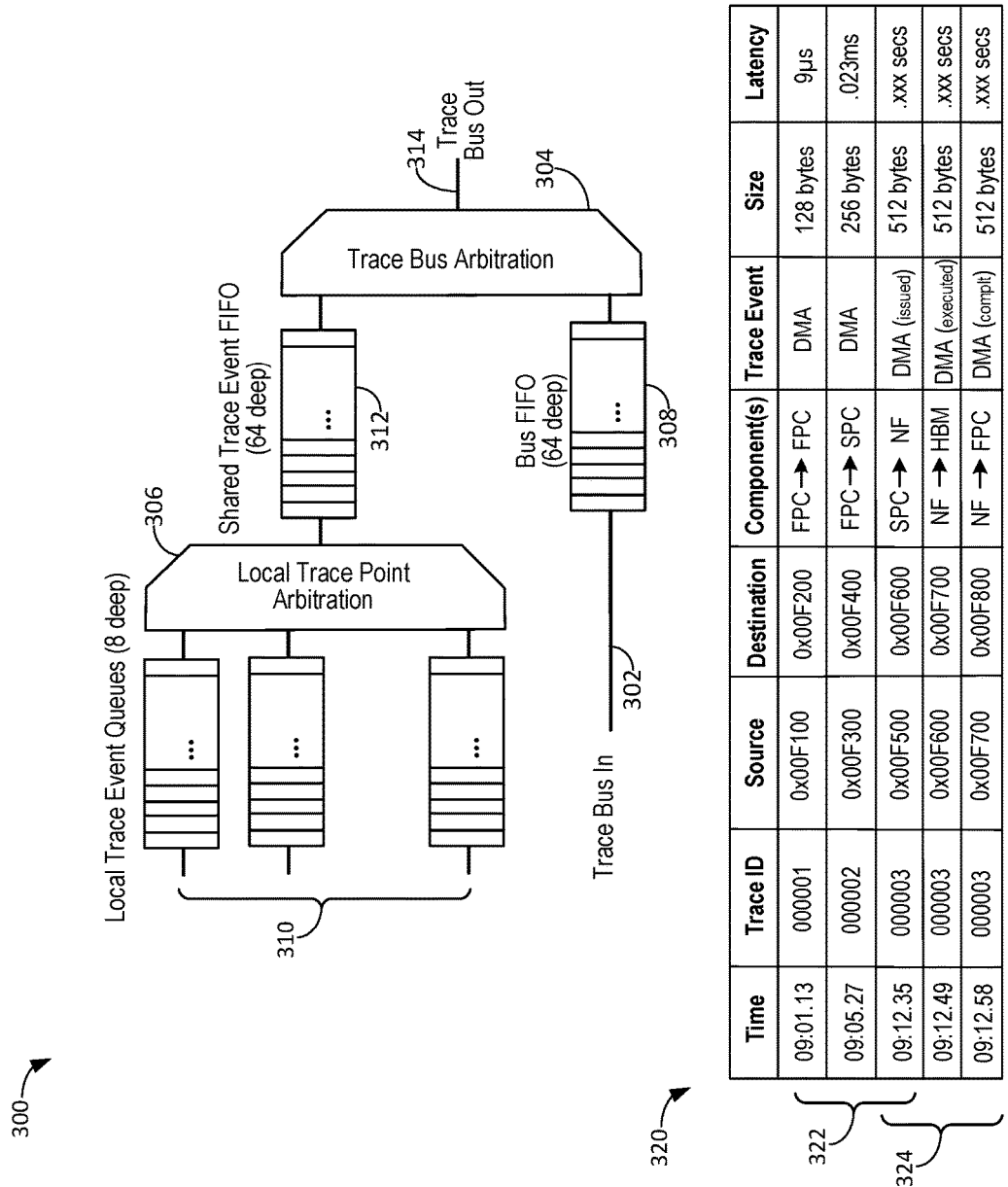
FIG. 3 illustrates a block diagram of an example trace mux design architecture and an example data structure.

FIG. 3 illustrates a block diagram of an example trace mux design architecture 300 and an example data structure 320. Trace mux design 300 generally includes a trace bus input 302, a bus arbiter 304, and a local trace point arbiter 306, a bus FIFO 308, at least one local trace event queue 310, a shared trace event FIFO 312, and a trace bus out 314.

Mux design 300 corresponds to an example trace mux disposed within a component of system 100. Mux design 300 can include the following functionality. Bus in 302 can relate to local trace point data that is temporarily stored within bus FIFO 308 until such that time arbitration logic (e.g., arbiter 304) can cause the trace data to be placed unto an example trace chain. One or more trace points for a component can insert trace event data into at least one local trace event queue 310. Arbiter 306 provides first level arbitration and enables selection of events from among the local trace events stored within queue 310. Selected events are place in shared trace event FIFO 312 which also functions as a storage queue.

Arbiter 304 provides second level arbitration that receives local trace events from FIFO queue 312 and merges the local trace events onto a particular trace chain 203, 205, 207 via trace bus out 314. In some implementations, trace entries may be pushed into local queues 310 faster than they can be merged to shared FIFO 312, or, alternatively, trace entries may be pushed into shared FIFO 312 faster than they can be merged onto trace bus 314. When these scenarios occur, the respective queues 310 and 312 will become full with trace data.

In some implementations, when either queue 310 or 312 becomes full with trace data, system 100 can be configured so that the newest trace entries are dropped and not stored to, or merged to, a particular queue. In other implementations, rather than dropping trace entries when certain queues fill up (e.g., queues 310, 312), system 100 can be configured to stall an example processing pipeline until queues that are filled once again have available queue space to receive entries.

For example, a processing pipeline that uses queues 310, 312 can be stalled until a sufficient, or threshold, number of trace entries are merged onto trace bus 314. The sufficient or threshold number can correspond to a particular number merged trace entries that result in available queue space for one or more trace entries to be received by queues 310, 312. Implementations in which processing pipelines are stalled, until downstream queue space becomes available, can provide higher-fidelity trace data based on certain trace entries being retained rather than dropped.

In some implementations, local trace queues are as wide as required by the trace entry, such that each trace entry takes only one spot in local queue 310. However, shared trace FIFO queue 312 can use a unique trace entry line encoding such that some trace entries can occupy two locations in shared queue 312. In some implementations, when any data of a trace packet is dropped, the full packet is dropped so that no partial packets appear in trace entry log 218.

In general, a trace is a timeline of activities or hardware events associated with a particular component of system 100. Unlike performance counters (described below), which are aggregate data, traces contain detailed event data that provide insight into hardware activity occurring during a specified trace window. The described hardware system enables extensive support for distributed hardware tracing, including generation of trace entries, temporary storage of trace entries in hardware managed buffer, static and dynamic enabling of one or more trace types, and streaming of trace entry data to host system 126.

In some implementations, traces can be generated for hardware events executed by components of system 100, such as, generating a DMA operation, executing a DMA operation, issuing/execution of certain instructions, or updating sync flags. In some instances, tracing activity can be used to track DMAs through the system, or to track instructions executing on a particular processor core.

System 100 can be configured to generate at least one data structure 320 that identifies one or more hardware events 322, 324 from a timeline of hardware events. In some implementations, data structure 320 arranges one or more hardware events 322, 324 in a time ordered sequence of events that are associated with at least FPC 104 and SPC 106. In some instances, system 100 can store data structure 320 in a memory bank of a host control device of host system 126. Data structure 320 can be used to assess performance of program code executed by at least processor cores 104 and 106.

As shown by hardware events 324, in some implementations, a particular trace identification (ID) number (e.g., trace ID '003) can be associated with multiple hardware events that occur across the distributed processor units. The multiple hardware events can correspond to a particular memory access operation (e.g., a DMA), and the particular trace ID number is used to correlate one or more hardware events.

For example, as indicated by event 324, a single trace ID for a DMA operation can include multiple time steps corresponding to multiple different points in the DMA. In some instances, trace ID '003 can have an "issued" event, an "executed" event, and a "completed" event that are identified as being some time apart relative to each other. Hence, in this regard, the trace ID can be further used for determining a latency attribute of the memory access operation based on the correlation and with reference to the time steps.

In some implementations, generating data structure 320 can include, for example, system 100 comparing event time stamps of respective events in a first subset of hardware events with event time stamps of respective events in a second subset of hardware events. Generating data structure 320 can further include, system 100 providing, for presentation in the data structure, a correlated set of hardware events based, in part, on the comparison between the first subset of events and the second subset of events.

As shown in FIG. 3, data structure 320 can identify at least one parameter that indicates a latency attribute of a particular hardware event 322, 324. The latency attribute can indicate at least a duration of the particular hardware event. In some implementations, data structure 320 is generated by software instructions executed by a control device of host system 126. In some instances, structure 320 can be generated responsive to the control device storing trace entry data to a memory disk/unit of host system 126.

FIG. 4 is a block diagram 400 indicating example trace activity for a direct memory access (DMA) trace event executed by system 100. For DMA tracing, data for an example DMA operation originating from a first processor node to a second processor node can travel via ICI 112 and can generate intermediate ICI/router hops along the data path. The DMA operation will generate trace entries at each node within a processor chip, and along each hop, as the DMA operation traverses ICI 112. Information is captured by each of these generated trace entries to reconstruct a temporal progression of the DMA operations along the nodes and hops.

An example DMA operation can be associated with the process steps depicted in the implementation of FIG. 4. For this operation, a local DMA transfers data from a virtual memory 402 (vmem 402) associated with at least one of processor cores 104, 106 to HBM 108. The numbering depicted in diagram 400 correspond to the steps of table 404 and generally represents activities in node fabric 110 or activities initiated by node fabric 110.

The steps of table 404 generally describe associated trace points. The example operation will generate six trace entries for this DMA. Step one includes the initial DMA request from the processor core to node fabric 110 which generates a trace point in the node fabric. Step two includes a read command in which node fabric 110 asks the processor core to transfer data which generates another trace point in node fabric 110. The example operation does not have a trace entry for step three when vmem 402 completes a read of node fabric 110.

Step four includes node fabric 110 performing a read resource update to cause a sync flag update in the processor core which generates a trace point in the processor core. Step five includes a write command in which node fabric 110 notifies memory mux 108 of the forthcoming data to be written to the HBM. The notification via the write command generates a trace point in node fabric 110, while at step six, completion of the write to HBM also generates a trace point in node fabric 110. At step seven, node fabric 110 performs a write resource update to cause a sync flag update in the processor core which generates a trace point in the processor core (e.g., in FPC 104). In addition to the write resource update, node fabric 110 can perform an acknowledge update ("ack update") where data completion for the DMA operation is signaled back to the processor core. The ack update can generate trace entries that are similar to trace entries generated by the write resource update.

In another example DMA operation, a first trace entry is generated when a DMA instruction is issued in a node fabric 110 of the originating node. Additional trace entries can be generated in node fabric 110 to capture time used to read data for the DMA and writing the data to outgoing queues. In some implementations, node fabric 110 can packetize DMA data into smaller chunks of data. For data packetized into smaller chunks, read and write trace entries can be produced for a first data chunk and a last data chunk. Optionally, in addition to the first and last data chunks, all data chunks can be set to generate trace entries.

For remote/non-local DMA operations that may require ICI hops, the first data and the last data chunk can generate additional trace entries at ingress and egress points in each intermediate hop along ICI/router 112. When DMA data arrives at a destination node, trace entries similar to the previous node fabric 110 entries are generated (e.g., read/write of first and last data chunks) at the destination node. In some implementations, a final step of the DMA operation can include executed instructions associated with the DMA causing an update to a sync flag at the destination node. When the sync flag is updated a trace entry can be generated indicating completion of the DMA operation.

In some implementations, DMA tracing is initiated by FPC 104, SPC 106, or HIB 114 when in each component is in trace mode such that trace points can be executed. Components of system 100 can enter trace mode based on global controls in FPC 104 or SPC 106 via a trigger mechanism. The trace points trigger in response to the occurrence of a specific action or condition associated with execution of program code by the components of system 100. For example, portions of the program code can include embedded trigger functions that are detectable by at least one hardware component of system 100.

The components of system 100 can be configured to detect a trigger function associated with portions of program code executed by at least one of FPC 104 or SPC 106. In some instances, the trigger function can correspond to at least one of: 1) a particular sequence step in a portion or module of the executed program code; or 2) a particular time parameter indicated by the GTC used by the distributed processor units of system 100.

Responsive to detecting the trigger function, a particular component of system 100 can initiate, trigger, or execute at least one trace point (e.g., a trace event) that causes trace entry data associated with one or more hardware events to be stored in at least one memory buffer of the hardware component. As noted above, stored trace data can then be provided to chip manager 216 by way of at least one trace chain 203, 205, 207.

As noted above, FIGS. 1-4 have illustrated approaches for hardware event tracing in a distributed computing system. The remaining FIGS. 5-7 describe approaches for synchronized hardware event collection in a distributed computing system. The synchronized collection of hardware events can be based, at least in part, on one or more trigger mechanisms.

FIG. 5 illustrates an example data structure for a global time counter (GTC) 502 and tables 504 and 506 that indicate usage scenarios of the GTC 502 by an example computing system for distributed hardware tracing (e.g., system 100). In the implementation of FIG. 5, GTC 502 is a 64-bit value that includes a 60-bit counter and a 4-bit offset. In alternative implementations, GTC 502 can be a fixed-sized piece of binary data having a size, in bits, that ranges from fewer than 64 bits to more than 64 bits.

The data structure associated with GTC 502 applies to a global master counter as well as to local time counters (LTCs) described below with reference to the implementation of FIG. 6. The upper 60 bits of GTC 502 correspond to an actual time counter that increments by one per cycle, except when "catching up" or "catching down" to address GTC phase variations (described below). For example, during an update of a local GTC 502 (i.e., an LTC), it is possible for the local GTC 502 to not "tick" for several cycles in order to "catch-down" to a master global GTC 502. In these scenarios, the lower four "offset" bits are used to compensate for GTC phase variations that can occur during program code execution.

When addressing GTC phase variations, the last four bits can be incremented in these circumstances to, in part, maintain differentiation between timestamps for local hardware event activities whose GTC's would otherwise be identical. In most other instances, the 4-bit offset of GTC 502 are clear and, thus, unused. In some implementations, the offset bits can count up to 15 and then stop. While, in alternative implementations, the offset bits can count to any integer value as needed by a particular counter design. In some instances, the offset bits are cleared when the upper 60 bits of GTC 502 start ticking again.

With regard to configuration and management of GTC 502, 602 (described below), in some implementations, the executed program code can configure or set-up a GTC by configuring one or more processor chips of system 100. Configuring the processor chips can include designating a global master GTC for the system as well as designating local master GTCs (i.e., LTCs) for respective nodes or components of system 100.

The components can include hardware knobs/features that executing program code/software uses to compute and compensate for clock latencies and to perform manual tuning of one or more local GTCs (i.e., LTCs of FIG. 6). LTC compensation for clock latencies and manual tuning are preformed relative to the master GTC, so as to minimize or mitigate phase variations. In some implementations, system 100 can include an auto-pilot mode for latency compensation in which component hardware features determine link latencies automatically by way of a "ping-and-echo" mechanism.

In some implementations, system 100 can include a link/software stack that includes a portion, or subset, of program code used to adjust parameter values of an example control/status register (CSR). In some instances, control signals generated in response to execution of the link stack program code causes one or more parameter values to written to the CSR. These CSR parameter values can be used to configure various aspects of GTC 502, 602 or LTCs.

For example, the one or more parameters can include: 1) a GTC_config parameter that causes selection of a master global GTC, local master GTC, or a local slave GTC and selection of an update sample size; 2) a GTC_sync parameter used to reset a master GTC or clear a "ping" measurement; 3) a GTC_latency_compensation_control parameter that configures manual latency compensations; 4) a GTC_link_ping parameter that indicates a minimum ping latency; 5) a GTC_count parameter that indicates an actual GTC value; and/or 6) a GTC_max_diff parameter that indicates a maximum observed difference between a local GTC and the master GTC.

As indicated above, a global master GTC 502 and one or more local GTCs 502 can be used by system 100 to obtain event time-stamps and to determine sequenced ordering among hardware events occurring within in the system. In addition to order among activities, GTC 502 can be used to determine latencies of activities. In some implementations, a particular GTC 502 can exhibit phase variations, hence, determined latencies may be inaccurate by one or more cycles.

As indicated above, the rate at which a certain GTC 502 increments can vary depending upon whether a local GTC is different from the global master, i.e., when there are phase variations. In a steady state, when there are no phase variations, a master global GTC 502 increments once per cycle and can be used to count latencies and order of local activities (e.g., of a certain component) just as well as a particular components LTC.

In some implementations, a master GTC 502 may count slower than a certain LTC. In these instances, the offset bits of GTC 502 continue to increment once per local clock cycle. As indicated by tables 504, 506, given the unique functionality of the GTC offset bits, an extended GTC ("GTC-ext") can be defined for use by system 100. In some implementations, GTC-ext can be constructed by adding the top 60 bits (GTC:top) and the bottom four offset bits (GTC:offset), while in other implementations, the program code executing in a particular processor can compute GTC-ext to equal GTC:top summed with a fractional GTC:offset value.

In some implementations, and in response to incrementing of the offset bits, a GTC-ext parameter can be used to determine event ordering as well as latencies of local operations. Tables 504, 506 indicate usage scenarios in which the GTC-ext parameter may prove useful when determining hardware event ordering and latency of event operations.

Table 504 describes example GTC usage for determining order between activities or hardware events. In some implementations, the rate at which a GTC 502 increments, during the course of an activity being analyzed, may not be relevant when using GTC 502 to determine global order, e.g., the order of one or more activities between at least two distinct computing nodes (e.g., distinct nodes that each have a master GTC). However, when a local GTC 502 at a particular node is slower than that nodes master GTC, GTC-ext can be used to differentiate between two local activities, or between when two local activities initiate writes to remote resources, as shown by feature 508 of table 504.

Table 506 describes example GTC usage for computing latency of local activities/events or activities that span two or more nodes. In some implementations, system parameters may not indicate whether a GTC 502 at a particular chip is ticking at a normal rate (i.e., in sync with a designated master global clock) or ticking at a rate that is off-phase with the designated master global. Thus, in some instances, LTC can used for event latency determination of local activities, as shown by feature 510 of table 506. While, in other implementations, GTC or GTC-ext can be used to measure latencies of one or more operations.

In general, hardware trace events that occur at various nodes or components of system 100 can include a GTC parameter. In some implementations, when traced hardware events/activities span multiple nodes of system 100, latencies associated with local activities should be computed via GTC rather than a LTC. In these implementations, use of GTC or GTC-ext can be the preferred counter/clock solution because LTC's across two or more distinct nodes may not be synchronized or clocking/ticking at the same rate.

FIG. 6 illustrates a block diagram of example time counters and one or more counters associated with respective components of an example computing system for distributed hardware tracing (e.g., system 100). The time counters can include global time counter (GTC) 602 and multiple local time counters (LTC) that are each associated with respective components of system 100.

For clarity, although FIG. 6 depicts a single LTC block coupled to particular components of system 100, in alternative implementations, each component can include one or multiple local time counters/LTCs. Further, although FIG. 6 depicts a single master GTC 602, this feature can also correspond to, or be representative of a particular LTC that is selected to function as the global master. For example, in some implementations, GTC 602 corresponds to counter selection logic implemented by host system 126 to select a particular LTC to function as a global master clock/counter.

In some instances, system 100 can select an example node of ICI 112 to function as a global master clock and the example node's LTC ticks by one per clock cycle. While, in alternative implementations, GTC 602 is a global time counter that functions as a global master clock and that broadcasts a particular time parameter to the components of system 100. In either implementation, GTC 602 can be a globally synchronous clock used to correlate hardware events that occur across system 100.

In some implementations, as described above, GTC 602 can have small phase variations across system 100, but can be configured to avoid long term time-drift. For example, GTC 602 can tick or count based on an example oscillator of a particular processor chip (e.g., an oscillator selected to be the global master). In general, there is no long-term drift or phase variations specific to the selected oscillator of a processor chip in system 100, however, over time drift or variations can occur relative to oscillators between distinct processor chips. Hence, GTC 602 may increment (i.e., tick) faster or slower than a local clock (LTC) at a processor chip that is not the global master.

As the global master, a current master value of GTC 602 can be broadcast out to all nodes of ICI 112. Example ICI nodes can correspond to the one or more components of system 100. Receiving nodes can compute a difference between its local value of an example GTC used for local operations specific to the particular component/node. A minimum difference between the received master value and the local GTC value over an example sampling period can be used to update the local GTC. Over time, phase variations between the master value and the local GTC values, if any, may be "caught-up" based on counter adjustments implemented using the one or more offset bits discussed above.

As shown in the implementation of FIG. 6, components of system 100 can each include one or more performance counters, and collective sets, or subsets, of performance counters within system 100 are described herein as multiple counters 600. In particular, and specific to each component, FPC 104 can include multiple counters 604, SPC 106 can include multiple counters 606, mux memory (HBM) 108 can include multiple counters 608, node fabric 110 can include multiple counters 610, ICI 112 can include multiple counters 612, and HIB 114 can include multiple counters 614.

In system 100, performance analysis of program code executing by one or more processors can be enabled/disabled based on use of one or more hardware performance counters associated with particular components of the system. These performance counters can correspond to the multiple respective counters of FIG. 6 and can include at least one of the following: 1) activity counters; 2) stall counters; 3) statistical counters; and 4) sampling counters.

In some implementations, system 100 includes various other types of performance counters that can programmed to increment and store specified count data associated with technical aspects of the executing program code. Further, through use of the one or more counters, hardware support for tracing activity can include functions related to, for example: capture of instruction tracing event data; capture of memory mux tracing event data; capture of DMA tracing event data; and capture of event data in trace buffers.

In some implementations, at least a subset of multiple counters 600 can be CSRs or count registers that are accessible by host system 126 via HIB 114. These count registers/CSRs can be storage devices that are configured to store various types of count data/information that identifies instructions received, processed, or executed by a particular hardware component, as well as a variety of other types of data/information associated with technical aspects of executing program code. In some instances, the data is stored in the form counts or increments associated with particular instructions or processor operations (e.g., a count parameter). In some implementations, multiple counters 600 of system 100 can correspond to hundreds or thousands of performance counters/count registers.

Regarding the at least four types of performance counters noted above, in some implementations, activity counters can be used to store and analyze data associated with utilization parameters for different hardware units. Activity counters can be also used to analyze portions of executing program code or to analyze quantities or types of data being transferred during code execution. For example, some processor cores can include activity counters that are used to derive instruction mix in various streams of instructions. For example, an activity counter can be configured to store counts associated with execution of particular instruction types in an example instruction stream.

In some implementations, activity counters can include sub-sets of counters such as: issue counters that are incremented upon issuance of certain instruction types; memory activity counters that are available on memory paths and that are incremented in response to, e.g., reads/writes associated with memory transfers between (e.g., between mux 108 and a VMEM 402); and one or more other general activity counters that are incremented in response to the occurrence of instructions such as interrupts, sync flags, and alarm counters.

Regarding stall counters, in some implementations, these counters can provide stall counts indicating a number of cycles a certain hardware unit/component was stalled due to a particular stall reason instead of doing useful work associated with instruction processing or data computations. For example, when utilization of a particular hardware unit is below a threshold utilization, or the program code is not performing at a desired threshold performance level, the stall counters can be used by, system 100, to obtain pertinent stall information for conducting root-cause analysis of utilization and performance issues (e.g., below threshold utilization/performance).

In some implementations, stall counters can provide pertinent information related to: stalls based on detection of certain normally available memory paths that are indicated as unavailable; stalls based on delayed execution of one or more sync flag instructions; and/or stalls due to one or more normally available execution units (e.g., XU 122 or RPU 124) that are indicated as unavailable.

In some implementations, FPC 104 can include at least one scalar unit that provides scalar quantities for vectorized computations performed by VPU 118. Stall counters associated with the scalar unit can provide pertinent information for stalls that are due to one or more hazards that can occur within the scalar unit. In some instances, various hazard types can occur and FPC 104 can include stall counters for each hazard type. Example hazard types can include DMA delay hazards, scalar fence delay hazards, and/or scalar delay instruction hazard.

Regarding statistical counters, in some implementations, components of system 100 can include one or more data queues (e.g., storage mediums) and activity counters can be configured to provide information related to queue utilization. However, in some instances, activity counters for the queues may not be sufficient to provide all information about how well queues are being utilized by executing program code. In these instances, statistical counters can be available in one or more components to acquire certain data counts such that computations relating to average queue occupancy and time spent in certain queues can be determined.

In some implementations, queue statistical counters can provide statistical counts relating to queue occupancy, queue insertion status, queue full status, or queue at threshold occupancy status. In some instances, when the queue statistical counter is active, an occupancy counter associated with a component queue is incremented based on the current occupancy of the queue in each processor/instruction cycle.

In other instances, when an active queue statistical counter provides counts relating to queue full status, the counter is incremented (e.g., by one) in cycles in which a queue is fully occupied. Further, when an active queue statistical counter provides counts relating to queue insertion status, the counter is incremented in response to data chunks being placed into (i.e., queue insertion) the queue. Further still, for queue at threshold occupancy status, the counter can increment (e.g., by one) in each cycle in which the current queue occupancy is greater than a particular queue threshold occupancy.

In some implementations, components of system 100 can include sets of sampling counters that can be periodically read from host system 126 to generate data structures (e.g., structures 320 or 620). The data structures can include sampled statistics about hardware events, trace activity, or detailed data processing information for activities/events occurring in distributed processor units of system 100. In some implementations, data structures generated based on sampled statistics can include, e.g., structure 320 (described above) or structure 620 (described below). In some instances, the generated data structures are used to build one or more monitoring tools used by monitoring engine 128, of host system 126, to analyze performance of program code executed by the components of system 100.

As noted above, components of system 100 can initiate event tracing based on global controls associated with one or more trigger mechanisms. In some implementations, multiple counters 600 can be enabled, disabled, or otherwise controlled to initiate trigger mechanisms that cause trace points to execute and generate trace entries including specific data related to one or more hardware events. In some implementations, trace entries relating to hardware events are populated with event data based, at least in part, on counts data aggregated by one or more of the multiple counters 600 described above.

The global controls generally include use of CSR controls (i.e., specific CSR hardware features/knobs) as well as trigger mechanisms that permit counters to be incremented and that permit traces to be generated in a coordinated and synchronized manner. In some implementations, coordinated and synchronized control can occur across the distributed processor units of system 100. As discussed above, synchronized tracing can be enabled, in part, through use of a globally synchronous counter that is used as a global master clock (e.g., GTC 602).

In some implementations, system 100 triggers synchronized event tracing based on a particular time parameter indicated by a global time clock of the distributed processor units (e.g., time parameter 09:01.13). For example, system 100 can use global master clock values of GTC 602 as a trigger to start and stop all counters and tracing precisely for the duration of a certain operation.

In some instances, an example software compiler of system 100 can embed or insert, within the executing program code, instructions including operands or parameter values for a trigger mechanism that is based on a specific predefined time window associated with GTC 602. The predefined time window can include an example trace duration that has a trace event start-time (e.g., a first GTC 602 time parameter) and a trace event end-time (e.g., a second GTC 602 time parameter that is later in time than the first GTC time parameter).

As shown in the implementation of FIG. 6, the components of system 100 can include multiple performance counters 600. As it relates to triggers mechanisms, performance counter controls can include mechanisms to enable and disable the counters, as well as, to clear the counters and to pause the counters. Further, in addition to the statistical counter functions described above, some hardware units can include statistical counters that have associated selectors (e.g., CSRs) used to select a subset of hardware blocks within the hardware unit whose events are counted.

As discussed above with reference to trace mux controls, in some implementations, tracing can be enabled and disabled based on CSR writes executed by system 100. In some instances, tracing can be dynamically started and stopped, by system 100, based on the value of an example trace-mark (TM) register in FPC 104 (or core 116), or based on the value of an example TM register in SPC 106.

In some implementations, an example trace control parameter can be used to define a particular trace window. For example, the trace control parameter can permit trace windows to be defined in terms of lower and upper bounds of GTC 602 (e.g., start time & stop time clock values), and lower and upper bounds of an example trace-mark register in FPC 104 or an example trace-mark register in SPC 106.

In some implementations, program code executing within system 100 can include trigger processing logic for triggering trace events each processor cycle within one of FPC 104 or SPC 106. In some instances, the trigger logic is associated with a special "set trace-mark" instruction that can be inserted, by the executing software/program code, into one or more instruction streams.

For example, and regarding the trigger logic for FPC 104, when an example instruction to set a trace-mark is issued within FPC 104, the trigger logic can include analyzing a trace-mark operand of the instruction and comparing a parameter value of the operand to values of an example trace-mark window. This analysis and comparison is used to determine whether the operand parameter value is either equal to a lower bound value, or falls within the lower bound value and an upper bound value of a particular trace-mark window.

If a parameter value of the operand falls within the bounds of the trace-mark window, a trigger can be fired (e.g., trigger condition satisfied) and FPC 104 can enter a tracing or counting mode and enable one or more counters of multiple counters 604. In some implementations, FPC 104 exits the tracing/counting mode when a subsequent "set trace-mark" instruction includes an operand parameter value that causes a stop counting trigger to fire based on the operand value being either equal to, or outside of, the upper bound of an example trace-mark window.

In some implementations, system 100 can detect that a trigger condition is satisfied based on at least one of: i) identifying an occurrence of an example trace-mark operand in at least a first portion of the executing program code. The trace-mark operand can include a parameter value (e.g., a code step sequence/value) that is used to initiate one or more trace events and/or performance counting. System 100 can also detect that a trigger condition is satisfied based on a determination that a current time GTC 602 indicates a predefined time value that is used to initiate one or more trace events and/or performance counting.

Responsive to detecting that the trigger condition is satisfied, a processor component of system 100 can generate a control signal that is received by a count register of the processor component. The control signal can cause various count data associated with one or more hardware events to be stored in the count register. In some implementations, system 100 can be configured or programmed to generate, e.g., via host system 126, a data structure that indicates one or more performance attributes associated with the executing program code. For example, the data structure can be generated based on one or more count parameters of the stored count data. In some implementations, the count register is one of multiple performance counters 600 configured to store count data about the performance of one or more processor components of the system 100.

To further illustrate the track-mark trigger, in an example code sequence, the set trace-mark instruction can include a 32-bit trigger operand that identifies a distributed software construct (e.g., a computational step in an example neural network inference workload). FPC 104 can include is a special purpose CSR, identified in the program code as "tracemark_limits." Although 32-bit operands are described in this example code sequence, in alternative implementations, trigger operands or register limit operands/parameter values can be binary data structures having fewer than 32-bits or more than 32-bits.

This special purpose CSR can encode at least two 32-bit values. A first encoded 32-bit value can correspond to a lower trace-mark limit used to start tracing/counting, while a second encoded 32-bit value can correspond to an upper trace-mark limit used to stop tracing/counting. In some implementations, the first and second encoded values correspond to computational steps in a distributed software program/construct, such as an example neural network inference workload, or any other distributed program code.

Referring again to the example code sequence, when the "set trace-mark" instruction is executed, the 32-bit operand value is compared to the first and second encoded values in the tracemark_limits register. Based on this comparison, if the trigger operand equals/matches, or has a higher value than, the start value (i.e., the first encoded value), performance analysis activity is triggered. Likewise, if the trigger operand matches, or has a higher value than, the stop value (i.e., the second encoded value), on-going performance analysis activity is stopped.

Much like the trace-mark trigger, when GTC 602 is used as a trigger (e.g., for FPC 104 or SPC 106), the upper and lower bounds of example GTC/LTC trigger registers for a particular component can be evaluated against a current value of GTC 602. Hence, a current time parameter or value of GTC 602 can be compared to a lower bound of an example predefined time-window to execute tracing activity using a GTC trigger. Similarly, after execution of the GTC trigger to begin counting activity, a current time parameter or value of GTC 602 can be compared to the upper bound of the GTC trigger register to determine if GTC 602 matches, or falls outside of, the upper bound value. In response to GTC 602 at least matching the upper bound value, a stop counting trigger will fire to cause the component to exit counting mode.

In some implementations, SPC 106 includes a counterpart to the set trace-mark instruction of FPC 104. Hence, trigger processing logic for SPC 106 can function in the same, or substantially similar, manner as in FPC 104. For example, a trace-mark parameter can be included as an operand to one or more instructions issued by SPC 106. In some instances, trigger evaluation of the operand occurs at each instruction issue, and the evaluation logic can be substantially similar to the manner in which counting is enabled in FPC 104 (e.g., using a trace-mark operand). For example, in SPC 106, when a trace-mark operand included in a set trace-mark instruction is within the lower and upper bounds of an example trace window, tracing is enabled. Likewise, when the trace-mark operand included in the trace-mark instruction is outside of the lower and upper bounds of the trace window, tracing is disabled.

As discussed above, in addition to using GTC 602 or trace markers, system 100 can include an "everyone" trace mode. In general, this everyone trace mode can cause tracing across an entire processor chip to be controlled by, for example, a control signal generated by a component of FPC 104 or SPC 106. In some implementations, the control signal can be a global control parameter that indicates a particular performance state of the distributed processor units of system 100. In some instances, the particular performance state corresponds to the "everyone" trace mode.

In some implementations, one or more hardware components (e.g., HIB 114 or ICI 112) can be programmed or configured to initiate event tracing in response to activation of the "everyone" trace mode, or to simply disregard a propagating control signal indicating the everyone trace mode. Thus, although system 100 can include a signaling mechanism to propagate an everyone trace control signal, system 100 can also include mechanisms to cause at least one hardware component to ignore the control signal.

For example, a user (e.g., a performance analyst) of system 100 may want to use HIB 114 to track data packets that indicate all host communications. The user can insert, e.g., via an external compiler, an example program instruction to cause HIB 114 to enter an "always trace" mode, while also using the everyone trace mode to capture certain single step sequences of data from other hardware components of system 100. Hence, when programmed to execute in always trace mode, HIB 114 can disregard the everyone trace control signal used to generate single step sequence trace data from other hardware components.

In some implementations, trace points can trigger in response to the occurrence of a specific action or condition relating to execution of program code by the components of system 100. For example, a distributed software program can include multiple software modules that each include shared or overlapping code sequences or steps. For example, processor cores 104, 106 can each receive and execute portions of a distributed software program and each program portion can include an example code sequence 1-100.

As indicated above, in some implementations, system 100 can be configured to include one or more trigger conditions/mechanisms that have, or that are based on, a particular sequence step of the distributed program code. Hence, system 100 can be configured to trigger a trace point in response to each of processor cores 104, 106 arriving at a certain coded sequence/step (e.g., code sequence step 33) during code execution. In some instances, portions of the executed distributed program code can include embedded trigger functions that are detectable by at least one hardware component of system 100.

For example, as noted above, system 100 can be configured to detect that one or more trigger conditions are satisfied based identifying occurrences of operands in at least a portion of the program code executed by one of FPC 104 or SPC 106. Responsive to detecting that at least one trigger condition is satisfied, system 100 can initiate one or more trace events that generate trace entries/trace data or counts data. In some implementations, the generated trace entries can include at least one attribute that is shared among respective hardware events occurring across the distributed processor units (e.g., a shared time stamp or code sequence step).

For example, and as shown by data structure 620, generated trace entries 622 can correspond to a synchronized trace event and the trace data can include unique trace identifiers for respective hardware events and a global hardware event time stamp (e.g., 09:01.13) shared among at least two respective hardware events. Thus, for trace entries 622, at least one attribute shared among respective hardware events can be the hardware event time stamp. Likewise, when system 100 triggers trace points based on a particular code sequence, for trace entries 624 at least one attribute that is shared among respective hardware events can be the code sequence or trace-mark step.

In some implementations, trace entries can include a timestamp header or field. The timestamp header can include a 48-bit timestamp that identifies the time that the trace entry was generated. In some instances, the timestamp header can correspond to a low 48 bits of GTC 502.

As indicated above, in some implementations, a compiler of system 100 can insert one or more operands for multiple trigger conditions into portions of program code executed by example processor cores of system 100. For example, a compiler associated with FPC 104 can insert, or embed, one or more operands for trigger conditions into portions of program code executed by FPC 104. Likewise, a compiler associated with SPC 106 can insert, or embed, one or more operands for trigger conditions in portions of program code executed by SPC 106.

In general, and as noted above, system 100 is configured to detect the one or more triggers conditions and, responsive to detecting the conditions, initiate at least one trace event. In some implementations, initiating the at least one trace event can include system 100 providing, for example, a first control signal to a first performance counter/register (e.g., a CSR such as an activity counter) of FPC 104. This first control signal can cause data associated with at least one hardware event to be stored in the first performance counter.

Likewise, in some implementations, initiating the at least one trace event can further include system 100 providing, for example, a second control signal to a second performance counter/register (e.g., a CSR such as a statistic counter) of SPC 106. This second control signal can cause data associated with at least one hardware event to be stored in the second performance counter.

In some implementations, the data associated with the at least one hardware event can include one of: 1) a number of bytes written to a particular memory buffer of a certain processor core of the distributed processor units of system 100; or 2) a number of instructions executed by a certain processor core of the distributed processor units of system 100.

In general, the described tracing system includes hardware based trigger-action mechanisms. The triggers can be configured early to fire based on software semantics. For example, operands for trigger conditions can be inserted or embedded at prologues and epilogues of software components (e.g., at functions, loop-headers, or other opportune places in a distributed software system). As noted above, in some instances, the insertion of operands for trigger conditions is done by a compiler in system 100, while in other instances, triggers and trigger operands can be embedded/inserted by programmers prior to code execution by system 100, or can be embedded, during real-time code execution, by host system 126.

For example, in some implementations, a condition indicating when the trigger is to fire can be setup across a distributed hardware system (e.g., in each chip/node of system 100) by performance analysis software executing on host system 126. When the trigger fires, hardware tracing and performance counting is performed in a particular hardware unit, and similar trigger conditions are setup to stop trace data collection.

In other implementations, a trigger in system 100 can be a monotonically increasing value that is an operand to an instruction. The instruction can be inserted at prologues and epilogues of important software constructs by an example compiler of a processor core. In general, there is negligible performance penalty, for the executing program code, to having the trigger operand in the instruction be always present because performance data is not collected until a trigger fires.

For example, a trigger condition can be setup by writing to an example register in a hardware component. For evaluating or detecting the trigger, each time a trigger instruction is encountered, the hardware component can compare the value in this register with the operand value of the trigger condition in the instruction. Generally, a trigger condition should be setup well in advance of certain coded sequence steps such that none of the processor chips/nodes in the distributed system will pre-maturely arrive at the trigger condition.

In some instances, hardware trigger implementation requires propagating a trigger signal within different components of an example processor chip/node. At least one benefit of the trigger-action mechanism enables a distributed software program to execute an activity (e.g., code sequence step 33) on a first node at a time very different from a related activity (e.g., code sequence step 33) at another (second) node. In this implementation, system 100 can maintain accurate collection of hardware performance data for identical or substantially related activities that are executed by different hardware components or processor nodes at different time periods.

In some implementations, an example trigger use case can include system 100 collecting multiple sets of trace data without reprogramming, resetting, or reinserting a particular trigger condition. For example, the executing program code can include software constructs that generate an instruction sequence in which the same operand to set a trace-mark appears multiple times. In some instances, the same set trace-mark operand can appear multiples times when a processor of system 100 executes a certain portion of the program code in a loop. During execution of a program loop, event tracing can begin and end in accordance with iterations of the program loop.

For example, a trigger condition can be satisfied, e.g., trigger fires and event tracing starts, based on an operand value that appears at the beginning of a loop iteration. Likewise, a trigger condition can be no longer satisfied, e.g., event tracing stops, based on an operand value that appears at the end of the loop iteration. In general, the beginning of a loop iteration and the end of a loop iteration can correspond to boundaries of a program loop for a given software construct. Hence, a tracing session can begin and end at each execution of the software construct (e.g., each loop iteration).

In some implementations, appropriate trigger operand values (e.g., GTC or trace-mark) can be determined in the following manner. As noted above, a distributed software program can include software modules that each include shared or overlapping code sequences or steps. During execution of the distributed program code within system 100, a performance analyst can read or analyze, via a computing console of system 100, a CSR value of a trace-mark register to determine, for example, a current code sequence or step number.

In some instances, the analyst repeatedly reads the CSR value to determine an average rate of increase of the sequence or steps. The determined rate of increase can be used to predictively set one or more triggers conditions based on occurrences of, e.g., a trace-mark operand values. In some implementations, when using GTC, a performance analyst can read or analyze the system/machine (or hardware component) clock speed to predict or determine a rate at which the GTC increases. The analyst can then use the determined rate to set one or more trigger conditions based on an occurrence of a particular GTC value.

FIG. 7 is a process flow diagram of an example process 700 for distributed hardware tracing using computing system 100 and the one or more nodes 200, 201 of system 100. Thus, process 700 can be implemented using one or more of the above-mentioned computing resources of systems 100 including resources of nodes 200, 201.

Process 700 begins at block 702 and includes computing system 100 monitoring execution of program code executed by a first processor core. In some implementations, the first processor core is configured to execute at least a first portion of the program code that is monitored. At block 704 of process 700, system 100 monitors execution of the program code executed by a second processor core. In some implementations, the second processor core is configured to execute at least a second portion of the program code that is monitored.

At block 706, system 100 detects that at least one trigger condition is satisfied. In some implementations, system 100 detects that the trigger condition is satisfied based on identifying an occurrence of an operand in at least a portion of the program code executed by one of the first processor core or the second processor core. In some implementations, program code executing within system 100 includes trigger processing logic for triggering trace events.

In some instances, the trigger logic is associated with a "set trace-mark" instruction that is inserted into one or more instruction streams. The trigger logic can include identifying the occurrence of a trace-mark operand of the instruction, analyzing the trace-mark operand, and comparing the operand to values of an example trace-mark window. In some instances, this analysis and comparison is used to detect that the first trigger condition is satisfied.

In other instances, the trigger logic is associated with a predefined time value that can be inserted into one or more instruction streams an external user of system 100 or by an example compiler of the system. The trigger logic can include determining that a current time of at least one clock of the computing system indicates a predefined time value used to initiate one or more trace events. In some implementations, determining that the current time indicates a predefined time value can include receiving the predefined time value and comparing the predefined time value to time values of an example predefined time window.

At block 708, responsive to detecting that the trigger condition is satisfied, system 100 initiates at least a first trace event that generates trace data. The generated trace data identifies respective hardware events occurring across distributed processor units that include at least the first processor core and the second processor core.

For example, responsive to detecting that the trigger condition is satisfied, system 100 can initiate a synchronized trace event that generates trace data identifying hardware events occurring across FPC 104 and SPC 106. In some implementations, the trace data identifies a unique trace identifier for respective hardware events. In some instances, the hardware events include multiple synchronized hardware events, and at least two hardware events of the multiple synchronized events are synchronized when the events share a global hardware event time stamp.

In some implementations, multiple trigger conditions can be associated with the executing program code. In some instances, a particular trigger condition can be satisfied based on identifying an occurrence of a particular operand in at least a portion of the program code executed by at least the first or second processor core. The particular operand can include one of multiple parameter values that can each be used to initiate a second trace event of the one or more trace events. In this implementation, detecting that the particular trigger condition is satisfied can include, system 100 detecting that a particular parameter value exceeds a first bound value of a register.

In some implementations, responsive to detecting that the particular trigger condition is satisfied, system 100 initiates a trace event generating trace data that identifies at least one attribute that is shared among respective hardware events occurring across the distributed processor units. In some implementations, an attribute of the respective hardware events can include at least a source memory address, a destination memory address, or a sequence/program compute step. Whereas at least one shared attribute can include a particular sequence step or program step of the program code.

In some implementations, one or more trigger conditions can be associated with at least one of: 1) a particular sequence step of the program code; 2) a global control parameter that indicates a particular performance state of the distributed processor units; 3) a current time or particular time parameter indicated by a global time clock/counter of the distributed processor units; or 4) a predefined time window associated with the global time clock.

In some implementations, system 100 can also detect that the particular parameter value of the particular operand, or a particular predefined time value, exceeds a second bound value of the register. In some instances, responsive to this detection, system 100 can stop the second trace event when the particular parameter value of a certain operand, or a certain predefined time value, exceeds the second bound value of the register.

At block 710 of process 700, system 100 provides, to a host device, a correlated set of trace data that includes the respective hardware events. In some implementations, the correlated set of trace data indicates at least a time ordered sequence of the respective hardware events that are generated when the first trigger condition is satisfied. For each of the respective hardware events, the trace data comprises at least a hardware event time stamp for the hardware event, and metadata characterizing the hardware event. In some instances, the correlated set of trace data corresponds, at least in part, to data structure 620.

At block 712, computing system 100 uses the correlated set of trace data to analyze performance of the program code executed by at least the first processor core and the second processor core. In some implementations, data structure 620 (i.e., corresponding to the correlated trace data) is used by host system 126 to analyze performance of the program code executed by at least processor cores 104 and 106. Likewise, data structure 620 can be used by host system 126 to analyze performance of at least one component of system 100.

For example, host system 126, or an example user, can analyze data structure 620 to detect or determine if there is a performance issue associated with execution of a particular software module of the program code. An example issue can include the software module failing to complete execution of certain instruction streams within an allotted execution time window, or below a threshold latency.

Further, the user, or host device/system 126, can detect or determine if a particular component of system 100 is operating above or below a threshold performance level. An example issue relating to component performance can include a particular hardware component generating result data that is outside acceptable threshold result parameter ranges. In some implementations, the generated result data may be inconsistent with result data generated by other related components of system 100 that execute substantially similar instructions/operations.

For example, during execution of the program code, a first component of system 100 can be required to complete an operation and to generate a result. Likewise, a second component of system 100 can be required to complete a substantially similar operation and to generate a substantially similar result. Analysis of a correlated set of trace data can indicate that the second component generated a result that is considerably different than the result generated by the first component. Likewise, an example data structure of correlated trace entries may indicate result parameter values of the second component which are outside of acceptable parameter ranges. These results can indicate a potential performance issue of the second component.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by an event collection system having one or more hardware circuit components, the method comprising:

monitoring execution of program code by a first multi-core neural network processor in the event collection system, the first multi-core neural network processor being configured to execute a first portion of the program code to perform computations for inference workloads of a multi-layer neural network, wherein the multi-layer neural network is implemented on a hardware circuit;

monitoring execution of the program code by a second multi-core neural network processor in the event collection system, the second multi-core neural network processor being configured to execute a second portion of the program code to perform the computations for the inference workloads of the multi-layer neural network;

detecting, by the event collection system, that a trigger condition is satisfied by identifying an occurrence of an operand in the first portion of the program code or the second portion of the program code, wherein each portion of the program code includes multiple code sequences that represent computational steps of the inference workload and the operand includes a first parameter value that indicates a particular code sequence of the multiple code sequences for initiating synchronized trace events;

responsive to detecting that the trigger condition is satisfied, initiating, by the event collection system, a first synchronized trace event that occurs during a particular computational step of the inference workload to generate trace data identifying respective hardware events occurring across distributed hardware circuit components of the event collection system, and for each of the respective hardware events, the trace data comprises a hardware event time stamp;

generating, by the event collection system and using the trace data, a data structure that correlates the trace data based on the particular computational step of the inference workload;

transmitting, to a host controller and using a host interface block of the event collection system, the data structure that includes the trace data correlated based on the particular computational step of the inference workload;

determining, by the host controller, one or more performance attributes based on the respective hardware events that were identified by the trace data in the data structure received using the host interface block; and using, by the host controller, the one or more performance attributes to analyze execution of the program code by the first and second multi-core neural network processors when the particular computational step is executed at the first and second multi-core neural network processors at different respective times.

2. The method of claim 1, wherein the first synchronized trace event generates trace data indicating a unique trace identifier for respective hardware events, and wherein the hardware events include a plurality of synchronized hardware events, and two hardware events are synchronized when the events are associated with the same computational step of the inference workload.

3. The method of claim 1, wherein detecting that the trigger condition is satisfied comprises:
detecting, by the event collection system, that one of:
i) the first parameter value of the operand exceeds a first bound value of a register, or
ii) a current time indicated by a clock of the event collection system exceeds a first bound value of a register; and
responsive to detecting that the trigger condition is satisfied, initiating, by the event collection system, a second synchronized trace event that generates trace data, wherein the trace data identifies at least one attribute that is shared among the respective hardware events occurring across the event collection system.

4. The method of claim 3, further comprising:
detecting, by the event collection system, that one of:
a second parameter value of the operand exceeds a second bound value of the register, or
the current time indicated by the clock of the event collection system exceeds a second bound value of the register; and
responsive to detecting, stopping, by the event collection system, the second trace event when the second parameter value of the operand exceeds the second bound value, or when the second predefined time value exceeds the second bound value.

5. The method of claim 3, wherein:
the operand further includes:
a global control parameter that indicates a particular performance state of the event collection system; and
the first bound value of the register includes at least one of:
a predefined time value indicated by a global time clock of the event collection system; or
a particular time value of a predefined time window associated with the global time clock.

6. The method of claim 3, wherein:
the operand has a first binary data structure and the first parameter value of the first operand corresponds to a trace-mark,
the first bound value of the register has a second binary data structure and the current time is indicated by a global time clock,
and wherein the global time clock is used by the event collection system to generate one or more hardware event time stamps.

7. The method of claim 3, further comprising:
inserting, by a compiler of the event collection system, the operand of the trigger condition into the first portion of program code executed by the first multi-core neural network processor; and
inserting, by the compiler of the event collection system, a predefined time value of the trigger condition into the second portion of program code executed by the second multi-core neural network processor.

8. The method of claim 3, wherein initiating at least one of the first synchronized trace event or the second synchronized trace event, comprises:
generating, by the event collection system, a first control signal received by a first count register of the first multi-core neural network processor, the first control signal causing data for a first hardware event to be stored in the first count register; and
generating, by the event collection system, a second control signal received by a second count register of the second multi-core neural network processor, the second control signal causing data for a second hardware event to be stored in the second count register.

9. The method of claim 8, wherein the data for one of the first hardware event or the second hardware event, comprises at least one of:
a number of bytes written to a particular memory buffer of a particular multi-core neural network processor of the event collection system; or
a number of instructions executed by a particular multi-core neural network processor of the event collection system.

10. The method of claim 1, further comprising:
identifying, by the event collection system, an occurrence of a second operand in the portion of the program code executed by the first or second multi-core neural network processor, the second operand including a second parameter value;
determining, by the event collection system, that a filter condition is satisfied based on the second parameter value of the second operand exceeding a particular bound value of a register or being below a particular bound value of the register; and
responsive to determining that the filter condition is satisfied, filtering, by the event collection system, one or more trace events, wherein filtering the one or more trace events comprises precluding storage of trace data for one or more hardware events.

11. A hardware event collection system, comprising:
one or more processor components including one or more processor cores;
one or more machine-readable storage units storing instructions that are executable by the one or more processor components to cause performance of operations comprising:
monitoring execution of program code by a first multi-core neural network processor in the event collection system, the first multi-core neural network processor being configured to execute a first portion of the program code to perform computations for inference workloads of a multi-layer neural network, wherein the multi-layer neural network is implemented on a hardware circuit;

monitoring execution of the program code by a second multi-core neural network processor in the event collection system, the second multi-core neural network processor being configured to execute a second portion of the program code to perform the computations for the inference workloads of the multi-layer neural network;

detecting, by the event collection system, that a trigger condition is satisfied by identifying an occurrence of an operand in the first portion of the program code or the second portion of the program code, wherein each portion of the program code includes multiple code sequences that represent computational steps of the inference workload and the operand includes a first parameter value that indicates a particular code sequence of the multiple code sequences for initiating synchronized trace events;

responsive to detecting that the trigger condition is satisfied, initiating, by the event collection system, a first synchronized trace event that occurs during a particular computational step of the inference workload to generate trace data identifying respective hardware events occurring across distributed hardware circuit components of the event collection system, and for each of the respective hardware events, the trace data comprises a hardware event time stamp;

generating, by the event collection system and using the trace data, a data structure that correlates the trace data based on the particular computational step of the inference workload;

transmitting, to a host controller and using a host interface block of the event collection system, the data structure that includes the trace data correlated based on the particular computational step of the inference workload;

determining, by the host controller, one or more performance attributes based on the respective hardware events that were identified by the trace data in the data structure received using the host interface block; and using, by the host controller, the one or more performance attributes to analyze execution of the program code by the first and second multi-core neural network processors when the particular computational step is executed at the first and second multi-core neural network processors at different respective times.

12. The hardware event collection system of claim 11, wherein the first synchronized trace event generates trace data indicating a unique trace identifier for respective hardware events, and wherein the hardware events include a plurality of synchronized hardware events, and two hardware events are synchronized when the events are associated with the same computational step of the inference workload.

13. The hardware event collection system of claim 11, wherein detecting that the trigger condition is satisfied comprises:
detecting, by the event collection system, that one of:
i) the first parameter value of the operand exceeds a first bound value of a register, or
ii) a current time indicated by a clock of the event collection system exceeds a first bound value of a register; and
responsive to detecting that the trigger condition is satisfied, initiating, by the event collection system, a second synchronized trace event that generates trace data, wherein the trace data identifies at least one attribute that is shared among the respective hardware events occurring across the event collection system.

14. The hardware event collection system of claim 13, wherein the operations further comprise:
detecting, by the event collection system, that one of:
a second parameter value of the operand exceeds a second bound value of the register, or
the current time indicated by the clock of the event collection system exceeds a second bound value of the register; and
responsive to detecting, stopping, by the event collection system, the second trace event when the second parameter value of the operand exceeds the second bound value, or when the second predefined time value exceeds the second bound value.

15. The hardware event collection system of claim 13, wherein:
the operand further includes:
a global control parameter that indicates a particular performance state of the event collection system; and
the first bound value of the register includes at least one of:
a predefined time value indicated by a global time clock of the event collection system; or
a particular time value of a predefined time window associated with the global time clock.

16. The hardware event collection system of claim 13, wherein:
the operand has a first binary data structure and the first parameter value of the first operand corresponds to a trace-mark,
the first bound value of the register has a second binary data structure and the current time is indicated by a global time clock,
and wherein the global time clock is used by the event collection system to generate one or more hardware event time stamps.

17. A computer-implemented method performed by an event collection system having one or more hardware circuit components, the method comprising:
monitoring execution of program code by a multi-core neural network processor in the event collection system, the program code being executed to perform computations for inference workloads of a multi-layer neural network that is implemented on a hardware circuit, and the multi-core neural network processor being configured to:
execute a first portion of the program code using a first core of the multi-core neural network processor; and
execute a second portion of the program code using a second core of the multi-core neural network processor;
detecting, by the event collection system, that a trigger condition is satisfied by identifying an occurrence of an operand in the first or second portion of the program code, wherein the program code includes multiple code sequences that represent computational steps of the inference workload and the operand includes a first parameter value that indicates a particular code sequence of the multiple code sequences for initiating synchronized trace events;
responsive to detecting that the trigger condition is satisfied, generating, by the event collection system and during a particular computational step of the inference workload, a control signal received by a count register of the multi-core neural network processor, the control signal causing count data for a hardware event to be stored in the count register when a trace event synchronized between the first and second processor cores is initiated by the event collection system during the particular computational step of the inference workload;

generating, by the event collection system and using the count data, a data structure that correlates the count data based on the particular computational step of the inference workload;

transmitting, to a host controller and using a host interface block of the event collection system, the data structure that includes the count data correlated based on the particular computational step of the inference workload;

determining, by the host controller, one or more performance attributes based on the count data for the hardware event that was stored in the count register and included in the data structure received using the host interface block; and using, by the host controller, the one or more performance attributes to analyze the executing program code when the particular computational step is executed at the first and second cores of the multi-core neural network processor at different respective times.

18. The method of claim 17, wherein the count register is one of multiple performance counters configured to store count data about the performance of the inference workloads by multi-core neural network processors of the event collection system, and wherein at least one performance counter includes one of: an activity counter, a stall counter, statistical counter, or a sampling counter.

19. The method of claim 18, wherein one or more count parameters of the count data indicates at least one of:
   i) a number of instructions received by a particular multi-core neural network processor;
   ii) a number of instructions processed by the particular multi-core neural network processor;
   iii) a number of instructions executed by the particular multi-core neural network processor; or
   iv) a number of memory reads and a number of memory writes performed by the particular multi-core neural network processor.

20. The method of claim 17, wherein a performance attribute that is used to analyze the executing program code comprises at least one of:
   i) a stall frequency of a particular multi-core neural network processor executing the program code;
   ii) an indication that utilization of the particular multi-core neural network processor is below a threshold utilization; or
   iii) an indication that a data storage queue used by the particular multi-core neural network processor is at, or below, a queue occupancy threshold.

* * * * *